(12) United States Patent
Islam et al.

(10) Patent No.: US 6,567,430 B1
(45) Date of Patent: May 20, 2003

(54) RAMAN OSCILLATOR INCLUDING AN INTRACAVITY FILTER AND AMPLIFIERS UTILIZING SAME

(75) Inventors: Mohammed N. Islam, Ann Arbor, MI (US); Michael J. Freeman, Canton, MI (US); Hayden H. Harris, Chelsea, MI (US)

(73) Assignees: Xtera Communications, Inc., Allen, TX (US); The Regents of the University of Michigan, Ann Arbor, MI (US)

(*) Notice: Subject to any disclaimer, the term of this patent is extended or adjusted under 35 U.S.C. 154(b) by 0 days.

(21) Appl. No.: 09/400,414

(22) Filed: Sep. 21, 1999

Related U.S. Application Data

(60) Provisional application No. 60/101,120, filed on Sep. 21, 1998.

(51) Int. Cl.[7] .................... H01S 3/30; H01S 3/083; H01S 3/08
(52) U.S. Cl. .................... 372/3; 372/6; 372/94; 372/99
(58) Field of Search .................... 372/6, 3, 21, 22, 372/70, 71, 72, 94, 99; 385/39

(56) References Cited

U.S. PATENT DOCUMENTS

| | | | |
|---|---|---|---|
| 4,063,106 A | 12/1977 | Ashkin et al. | 307/88.3 |
| 4,685,107 A | 8/1987 | Kafka et al. | 372/6 |
| 4,740,974 A | 4/1988 | Byron | 372/3 |
| 4,831,616 A | 5/1989 | Huber | 370/3 |
| 4,932,739 A | 6/1990 | Islam | 350/96.15 |
| 4,964,131 A | 10/1990 | Liu et al. | 372/6 |
| 4,995,690 A | 2/1991 | Islam | 350/96.15 |
| 5,020,050 A | 5/1991 | Islam | 370/4 |
| 5,039,199 A | 8/1991 | Mollenauer et al. | 359/334 |
| 5,050,183 A | 9/1991 | Duling, III | 372/94 |

(List continued on next page.)

FOREIGN PATENT DOCUMENTS

| | | | |
|---|---|---|---|
| EP | 0 265 233 A1 | 4/1988 | G02F/1/35 |
| EP | 0 903 876 A1 | 3/1999 | H04B/10/17 |
| EP | 0 936 761 A1 | 8/1999 | H04B/10/18 |
| WO | WO 98/20587 | 5/1998 | H01S/3/30 |
| WO | 99/48176 A1 | 9/1999 | H01S/3/30 |

OTHER PUBLICATIONS

Sun, Y. et al., "80nm Ultra–Wideband Erbium–Doped Silicia Fibre Amplifier" Electronics Letters, Nov. 6, 1997, vol. 33, No. 23, pp. 1965–1967.

Wysocki, P.F. et al., "Broad–Band Erbium–Doped Fiber Amplifier Flattened Beyond 40nm Using Long–Period Grating Filter", IEEE Photonics, vol. 9, No. 10, Oct. 10, 1997, pp. 1343–1345.

Yamada, M. et al., "A Low–Noise and Gain–Flattened Amplifier Composed of a Silica–Based and a Fluoride–Based Er3+–Doped Fiber Amplifierin a Cascade Configuration", IEEE Photonics Letters, vol. 8, No. 5, May 1996, pp. 620–622.

(List continued on next page.)

Primary Examiner—Quyen Leung
Assistant Examiner—Armando Rodriguez
(74) Attorney, Agent, or Firm—Baker Botts L.L.P.

(57) ABSTRACT

In one embodiment, a Raman oscillator includes at least one laser cavity and a distributed gain fiber positioned in the at least one laser cavity having a single spatial mode over a pumping wavelength to a signal wavelength. The oscillator also includes a coupler adapted to be coupled to a pumping mechanism to pump the distributed gain fiber at the pumping wavelength to obtain an optical signal wherein distributed gain is provided by Raman amplification over at least one cascade order corresponding to the pumping wavelength. A filter is positioned in the at least one laser cavity and has at least one pass band with a transmission peak placed approximately at the at least one cascade order to filter the optical signal to obtain a filtered optical signal having the signal wavelength. The filter has a substantially continuous sinusoidal filter function over at least one period of the filter function.

119 Claims, 9 Drawing Sheets

U.S. PATENT DOCUMENTS

| | | | |
|---|---|---|---|
| 5,058,974 A | 10/1991 | Mollenauer | 385/27 |
| 5,078,464 A | 1/1992 | Islam | 385/122 |
| 5,101,456 A | 3/1992 | Islam | 385/27 |
| 5,107,360 A | 4/1992 | Huber | 359/124 |
| 5,115,488 A | 5/1992 | Islam et al. | 385/129 |
| 5,117,196 A | 5/1992 | Epworth et al. | 359/333 |
| 5,132,976 A | 7/1992 | Chung et al. | 372/6 |
| 5,134,620 A | 7/1992 | Huber | 372/6 |
| 5,140,456 A | 8/1992 | Huber | 359/341 |
| 5,151,908 A | 9/1992 | Huber | 372/6 |
| 5,153,762 A | 10/1992 | Huber | 359/125 |
| 5,159,601 A | 10/1992 | Huber | 372/6 |
| 5,166,821 A | 11/1992 | Huber | 359/238 |
| 5,187,760 A | 2/1993 | Huber | 385/37 |
| 5,191,586 A | 3/1993 | Huber | 372/6 |
| 5,191,628 A | 3/1993 | Byron | 385/27 |
| 5,200,964 A | 4/1993 | Huber | 372/26 |
| 5,208,819 A | 5/1993 | Huber | 372/32 |
| 5,210,631 A | 5/1993 | Huber et al. | 359/132 |
| 5,212,579 A | 5/1993 | Huber et al. | 359/182 |
| 5,218,655 A | 6/1993 | Mizrahi | 385/39 |
| 5,222,089 A | 6/1993 | Huber | 372/6 |
| 5,224,194 A | 6/1993 | Islam | 385/122 |
| 5,225,925 A | 7/1993 | Grubb et al. | 359/341 |
| 5,226,049 A | 7/1993 | Grubb | 372/6 |
| 5,243,609 A | 9/1993 | Huber | 372/9 |
| 5,257,124 A | 10/1993 | Glaab et al. | 359/124 |
| 5,268,910 A | 12/1993 | Huber | 372/6 |
| 5,271,024 A | 12/1993 | Huber | 372/6 |
| 5,283,686 A | 2/1994 | Huber | 359/337 |
| 5,293,545 A | 3/1994 | Huber | 359/111 |
| 5,295,016 A | 3/1994 | Van Deventer | 359/347 |
| 5,295,209 A | 3/1994 | Huber | 385/37 |
| 5,301,054 A | 4/1994 | Huber et al. | 359/132 |
| 5,321,543 A | 6/1994 | Huber | 359/187 |
| 5,321,707 A | 6/1994 | Huber | 372/6 |
| 5,323,404 A * | 6/1994 | Grubb | 372/6 |
| 5,331,449 A | 7/1994 | Huber et al. | 359/125 |
| 5,359,612 A | 10/1994 | Dennis et al. | 372/18 |
| 5,369,519 A | 11/1994 | Islam | 359/173 |
| 5,373,389 A | 12/1994 | Huber | 359/195 |
| 5,389,779 A | 2/1995 | Betzig et al. | 250/216 |
| 5,400,166 A | 3/1995 | Huber | 359/173 |
| 5,416,629 A | 5/1995 | Huber | 359/182 |
| 5,450,427 A | 9/1995 | Fermann et al. | 372/18 |
| 5,467,212 A | 11/1995 | Huber | 359/168 |
| 5,473,622 A | 12/1995 | Grubb | 372/6 |
| 5,477,555 A | 12/1995 | Debeau et al. | 372/25 |
| 5,479,291 A | 12/1995 | Smith et al. | 359/333 |
| 5,485,481 A | 1/1996 | Ventrudo et al. | 372/6 |
| 5,485,536 A | 1/1996 | Islam | 385/31 |
| 5,497,386 A | 3/1996 | Fontana | 372/18 |
| 5,504,609 A | 4/1996 | Alexander et al. | 359/125 |
| 5,504,771 A | 4/1996 | Vahala et al. | 372/94 |
| 5,513,194 A | 4/1996 | Froberg et al. | 372/6 |
| 5,521,738 A | 5/1996 | Froberg | 359/184 |
| 5,530,710 A | 6/1996 | Grubb | 372/6 |
| 5,532,864 A | 7/1996 | Alexander et al. | 359/177 |
| 5,541,947 A | 7/1996 | Mourou et al. | 372/25 |
| 5,542,011 A | 7/1996 | Robinson | 385/24 |
| 5,555,118 A | 9/1996 | Huber | 359/125 |
| 5,557,442 A | 9/1996 | Huber | 359/179 |
| 5,577,057 A | 11/1996 | Frisken | 372/18 |
| 5,579,143 A | 11/1996 | Huber | 359/130 |
| 5,600,473 A | 2/1997 | Huber | 359/179 |
| 5,617,434 A | 4/1997 | Tamura et al. | 372/6 |
| 5,623,508 A | 4/1997 | Grubb et al. | 372/3 |
| 5,659,351 A | 8/1997 | Huber | 348/7 |
| 5,659,559 A | 8/1997 | Ventrudo et al. | 372/6 |
| 5,659,644 A | 8/1997 | DiGiovanni et al. | 385/31 |
| 5,664,036 A | 9/1997 | Islam | 385/31 |
| 5,673,280 A | 9/1997 | Grubb et al. | 372/3 |
| 5,673,281 A | 9/1997 | Byer | 372/3 |
| 5,689,596 A | 11/1997 | Evans | 385/27 |
| 5,701,186 A | 12/1997 | Huber | 359/125 |
| 5,726,784 A | 3/1998 | Alexander et al. | 359/125 |
| 5,734,665 A | 3/1998 | Jeon et al. | 372/6 |
| 5,757,541 A | 5/1998 | Fidric | 359/341 |
| 5,768,012 A | 6/1998 | Zanoni et al. | 359/341 |
| 5,778,014 A * | 7/1998 | Islam | 372/6 |
| 5,796,909 A | 8/1998 | Islam | 385/147 |
| 5,798,855 A | 8/1998 | Alexander et al. | 359/177 |
| 5,815,518 A | 9/1998 | Reed et al. | 372/6 |
| 5,825,520 A | 10/1998 | Huber | 359/130 |
| 5,838,700 A | 11/1998 | Dianov et al. | 372/6 |
| 5,841,797 A | 11/1998 | Ventrudo et al. | 372/6 |
| 5,847,862 A | 12/1998 | Chraplyvy et al. | 359/337 |
| 5,861,981 A | 1/1999 | Jabr | 359/341 |
| 5,878,071 A | 3/1999 | Delavaux | 372/94 |
| 5,880,866 A | 3/1999 | Stolen | 359/138 |
| 5,883,736 A | 3/1999 | Oshima et al. | 359/341 |
| 5,887,093 A | 3/1999 | Hansen et al. | 385/27 |
| 5,920,423 A | 7/1999 | Grubb et al. | 359/341 |
| 6,043,927 A | 3/2000 | Islam | 359/332 |
| 6,052,393 A * | 4/2000 | Islam | 372/6 |
| 6,101,024 A | 8/2000 | Islam et al. | 359/334 |
| 6,229,838 B1 | 5/2001 | Flichy et al. | 373/60 |
| 6,239,902 B1 | 5/2001 | Islam et al. | 359/334 |
| 6,239,903 B1 | 5/2001 | Islam et al. | 359/337 |
| 6,335,820 B1 | 1/2002 | Islam | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |

OTHER PUBLICATIONS

Ma, M.X. et al., "240–km Repeater Spacing in a 5280–km WDM System Experiment Using 8x2.5 Gb/s NRZ Transmission", IEEE Photonics Technology Letters, vol. 10, No. 6, Jun. 1998, pp. 893–895.

Masuda, H. et al., "Ultrawide 75–nm 3–dB Gain–Band Optical Amplification with Erbium–Doped Fluoride Fiber Amplifiers and Distributed Raman Amplifiers", IEEE Photonics Technology Letters, vol. 10, No. 4, Apr. 1998, pp. 516–518.

Masuda, H. et al., "Wide–Band and Gain Flattened Hybrid Fiber Amplifier Consisting of an EDFA and a Multiwavelength Pumped Raman Amplifier", IEEE Photonics Technology Letters, vol. 11, No. 6, Jun. 1999, pp. 647–649.

Kawaii, S. et al., "Ultra–Wide, 75nm 3dB Gain–Band Optical Amplifier Utilizing Gain–Flattened Erbium–Doped Fluoride Fibre Amplifier and Discrete Raman Amplification", Electronic Letters, vol. 34, No. 9, Apr. 30, 1998, pp. 897–898.

Kawai, S. et al., "Ultrawide, 75nm 3dB Gain–Band Optical Amplifier Utilizing Erbium–Doped Fluoride Fiber and Raman Fiber", OFC Technical Digest, 1998.

Kidorf, H. et al., "Pump Interactions in a 100–nm Bandwidth Raman Amplifier", IEEE Electronics Technology Letters, vol. 11, No. 5, May 1999, pp. 530–532.

Ono, H. et al., "Gain–Flattened Er3+–Doped Fiber Amplifier for a WDM Signal in the 1.57–1.60–$\mu$m Wavelength Region", IEEE Photonics Technology Letters, vol. 9, No. 5, May 1997, pp. 596–598.

Hansen, P.B. et al., "529km Unrepeatered Transmission at 2.488 Gbit/s Using Dispersion Compensation, Forward Error Correction, and Remote Post–and Pre–amplifiers Pumped By Diode–Pumped Raman Lasers", IEEE Electronics Letters Online No. 19951043, Jul. 7, 1998.

Guy, M.J., et al., "Lossless Transmission of 2ps Pulses Over 45km of Standard Fibre at 1.3μm Using Distributed Raman Amplification", Electronics Letters, vol. 34, No. 8, Apr. 6, 1998, pp. 793–794.

Dianov, E.M. et al., "Highly Efficient 1.3μm Raman Fibre amplifier", Electronics Letters, vol. 34, No. 7, Apr. 2, 1998, pp. 669–670.

Chernikov, S. V. et al., "Raman Fibre Laser Operating at 1.24μm", Electronics Letters, vol. 34, No. 7, Apr. 2, 1998, pp. 680–681.

Liaw, S–K et al., "Passive Gain–Equilized Wide–Band Erbium–Doped Fiber Amplifier Using Samarium–Doped Fiber", IEEE Photonics Technology Letters, vol. 8, No. 7, Jul. 1996, pp. 879–881.

Masuda, M. et al., "Wideband, Gain–Flattened, Erbium–Doped Fibre Amplifiers with 3dB Bandwidths of >50nm", Electronics Letters, vol. 33, No. 12, Jun. 5, 1997, pp. 1070–1072.

Yang, F.S. et al., "Demonstration of Two–Pump Fibre Optical Parametric Amplification", Electronics Letters, vol. 33, No. 21, Oct. 9, 1997, pp. 1812–1813.

Kawai, S. et al., "Wide–Bandwidth and Long–Distance WDM Transmission Using Highly Gain–Flattened Hybrid Amplifier", IEEE Photonics Technology Letters, vol. 11, No. 7, Jul. 1999, pp. 886–888.

Paschotta, R. et al., "Ytterbium–Doped Fiber Amplifiers", IEEE Journal of Quantum Electronics, vol. 33, No. 7, Jul. 1997, pp. 1049–1056.

Chernikov, S.V. et al., "Raman Fibre Laser Operating at 1.24 μm" Electronics Letters, vol. 34, No. 7, Apr. 2, 1998, pp. 680–681.

Grubb, S.G. et al., "Fiber Raman Lasers Emit at Many Wavelengths", Laser Focus World, Feb. 1996, pp. 127–134.

Mollenauer, L.F. et al., "Dispersion–Managed Solitons for Terrestrial Transmission", Optical Society of America, 1999.

Hansen, S. L. et al., "Gain Limit in Erbium–Doped Fiber Amplifiers Due to Internal Rayleigh Backscattering", IEEE Photonics Technology Letters, vol. 4, No. 6, Jun. 1992, pp. 559–561.

Spirit, D.M. et al., "Systems Aspects of Raman Fibre Amplifiers", Optical Amplifiers for Communication, vol. 137, Pt. J, No. 4, Aug. 1990, pp. 221–224.

Mollenenauer, L.F. et al., "Soliton Propagation in Long Fibers with Periodically Compensated Loss", IEEE Journal of Quantum Electronics, vol. QE–22, No. 1, Jan. 1986, pp. 157–173.

Marhic, M.E. et al., "Cancellation of Stimulated–Raman–Scattering Cross Talk in Wavelength–Division–Multiplexed Optical Communication Systems by Series or Parallel Techniques", Optical Society of America, 1998, vol. 15, No. 3, pp. 958–963.

Hansen, P.B. et al., "Rayleigh Scattering Limitations in Distrigbuted Raman Pre–Amplifiers", IEEE Photonics Technology Letters, vol. 10, No. 1, Jan. 1998, pp. 159–161.

Ikeda, M., "Stimulated Raman Amplification Characteristics in Long Span Single–Mode Silica Fibers", Optics Communications, vol. 39, No. 3, 1981, pp. 148–152.

Solbach, K. et al., "Performance Degradation Due to Stimulated Raman Scattering in Wavelength–Division–Multiplexed Optical–Fibre Systems", Electronics Letters, vol. 19, No. 6, Aug. 4, 1983, pp. 641–643.

Grandpierre, A.G. et al., "Theory of Stimulated Raman Scattering Cancellation in Vawelength–Division–Multiplexed Systems via Spectral Inversion", IEEE Photonics Technology Letters, vol. 11, No. 10, Oct. 1999, pp. 1271–1273.

Chinn, S.R. "Analysis of Counter–Pumped Small–Signal Fibre Raman Amplifiers", Electronics Letters, vol. 33, No. 7, Mar. 27, 2997, pp. 607–608.

Stolen, R.H. et al., "Raman Gain in Glass Optical Waveguides", Appl. Phys. Lett. vol. 22, No. 6, Mar. 15, 1973, pp. 276–278.

Stolen, R.H. et al., "Development of the Stimulated Raman Spectrum in Single–Mode Silica Fibers", Optical Society of America, vol. 1, No. 4, Aug. 1984, pp. 662–667.

Nissov, M. et al., "100 Gb/s (10×10Gb/s) WDM Transmission Over 7200 km Using Distributed Raman Amplification", Center For Broadband Telecommunications, pp. 9–12.

Takachio, N. et al., "32×10 Gb/s Distributed Raman Amplification Transmission with 50–GHz Channel Spacing in the Zero–Dispersion Region over 640km of 1.55–μm Dispersion–shifted Fiber", NTT Labs.

* cited by examiner

1117nm  1175nm  1240nm  1310nm  1390nm

RAMAN OSCILLATOR INCLUDING AN INTRACAVITY FILTER AND AMPLIFIERS UTILIZING SAME

CROSS-REFERENCE TO RELATED APPLICATIONS

This application claims benefit of U.S. provisional application Ser. No. 60/101,120 entitled "Fiber Raman Oscillation and Amplifiers Based On Intracavity Periodic Transmission Filters" filed Sep. 21, 1998. This application is also related to U.S. patent application entitled "Chirped Period Gratings For Raman Amplification in Circular Loop Cavities" filed Feb. 12, 1999 and having U.S. Ser. No. 60/120, 408 and PCT patent application entitled "Dispersion Compensating and Amplifying Optical Element, Method for Minimizing Gain Tilt and Apparatus for Minimizing Non-Linear Interaction Between Band Pumps" filed Jun. 16, 1999 and having application No. PCT/US99/13551.

TECHNICAL FIELD

The present invention relates generally to optical oscillators and amplifiers used in fiber-optics for telecommunications, cable television and other fiber-optics applications. More particularly, the invention relates to optical oscillators and amplifiers based on Raman gain in a fiber that provides for a particularly simple implementation based on intracavity use of periodic transmission filters.

BACKGROUND ART

Optical amplifiers are one of the key enabling technologies for exploiting the bandwidth available in optical fibers. For example, optical amplifiers can be used to compensate for loss in fiber-optic transmission. Loss refers to the fact that the signal attenuates as it travels in a fiber due to intrinsic scattering, absorption and other extrinsic effects such as defects. Examples of optical amplifiers include erbium-doped fiber amplifiers (EDFAs) and Raman amplifiers. A key feature of optical amplifiers is that they be low-noise and broadband, thereby permitting wavelength-division-multiplexed (WDM) systems.

There are two main low-loss telecommunications windows in optical fibers at wavelengths of 1.3 and 1.55 microns. EDFAs have become the workhorse of the optical amplifier field, but they only operate in the 1.55 micron window. Raman amplifiers have the advantage that they can operate in both optical communication windows, and, in fact, over the entire transparency window of optical fibers. Also, Raman gain increases system reliability since there is no excess loss in the absence of pump power. Moreover, Raman-based amplifiers are fully compatible with fiber systems since they are all-fiber devices.

Stimulated Raman scattering amplifiers work on an entirely different principle than EDFAs. Stimulated Raman scattering amplifiers are based on nonlinear polarization of the dielectric silica host, whereas EDFAs are based on the doping of glass fibers with rare earth ions. Signal amplification in Raman amplifiers is due to stimulated scattering accompanied by the excitation of molecules into a vibrational state. In contrast, signal amplification in EDFAs is due to stimulated emission accompanied by relaxation of the excited ions to the ground state. Thus Raman amplifiers and erbium-doped amplifiers work on entirely different physical principles.

The nonlinear polarization in Raman amplifiers is third order in electric field strength, resulting in a nonlinear index of refraction and gain that are both proportional to the instantaneous pump intensity. In contrast, the medium polarization is linear in the EDFA. Also, whereas EDFAs have an upper state lifetime of about 10 msec, Raman amplifiers have a virtually instantaneous response.

The theoretical noise-figure contribution from signal-spontaneous beating for Raman amplifiers has been shown to be 3 dB. However, systems tests of Raman amplifiers have uncovered other sources of noise that generally are not important in EDFAs (c.f. A. E. White and S. G. Grubb, "Optical Fiber Components and Devices," Ch. 7 in *Optical Fiber Telecommunications IIIB*, eds. I. P Kaminow and T. L. Koch, Academic Press, 1997). The first source is the coupling of intensity fluctuations from the pump light to the signal. The fundamental cause of this noise is the lack of a long upper-state lifetime to buffer the Raman gain from fluctuations in the pump intensity. It has been shown that when a counter-propagating amplifier geometry is used, the transit time of the amplifier can be used to average gain fluctuations due to the pump. Second, double Rayleigh can also give significant contributions to the noise figure of Raman amplifiers because of the long lengths of fiber used. However, limiting the fiber lengths used and constructing multistage amplifiers can control the noise figure of the amplifier.

Several Raman laser and amplifier cavity designs exist as prior-art, but they are not very appropriate for broadband amplification of WDM systems. S. G. Grubb and A. J. Stentz (Laser Focus World, pp. 127–134, February 1996; also U.S. Pat. No. 5,323,404) have described a linear cavity that uses a series of gratings to define the end mirrors. However, the bandwidth of the gratings is sufficiently restrictive that the cavity can operate over only about 2 nm, which is inadequate for WDM applications.

As an improvement, Grubb, et al. (U.S. Pat. No. 5,623, 508) also describe a ring cavity that uses an intra-cavity isolator to reduce double Rayleigh scattering and uses a counter-propagating pump to avoid pump fluctuations from coupling to the signal channel. The ring cavity design, however, is substantially more complicated, and, since it also employs gratings, it is also narrow band.

Rather than using gratings, Chernikov, et al. (Electronics Letters, Vol. 31, pp. 472–473, March 1995), use wavelength selective couplers in their Raman cavity design. Whereas their original 1995 design uses five couplers, a simpler configuration using only two couplers is described later (Electronics Letters, Vol. 34, pp. 680–681, Apr. 2, 1998). The couplers used are fused fiber couplers that couple over certain Raman orders into a ring cavity while passing other Raman cascade orders onto an end mirror. By using these broader band devices they achieve a bandwidth between 6–10 nm. However, the couplers may be difficult to manufacture, are somewhat inefficient in that they do not completely couple over or pass through any of the Raman orders, and there are no means in the cavity for rejection or dampening of the double Rayleigh scattering.

Broader band designs of Raman cavities have also been disclosed. As described in U.S. Pat. No. 5,778,014, there are several advantages of the Sagnac Raman amplifier and laser designs over those based on gratings or wavelength-selective couplers. First, the Sagnac cavity is a simple, easily manufactured, all-fiber cavity that should reduce the cost of assembly and increase the device reliability. Second, the passive cavity Sagnac interferometer design has a noise dampening property during the cascaded amplification process, thereby leading to improved noise performance and stability. Third, the broadband cavity design and components should lead to a wider gain bandwidth (in excess of 10 nm) for WDM applications. However, since there is no wavelength control within the cavity, changes in pump power may lead to fluctuations in the output wavelength. Also, the Sagnac requires use of polarization controllers, unless the cavity is made of all polarization-maintaining components. Finally, the Sagnac may have a lower efficiency than linear grating-based cavities since the pump light is split along the two directions of the Sagnac.

An alternate cavity based on a circulator loop cavity and the use of chirped fiber gratings has also been described in the above-noted U.S. patent application No. 60/120,408 Feb. 12, 1999. The chirped gratings can also be composed of a series of gratings. The reflection band of each band is slightly shifted in frequency. The circulator loop design permits a strictly counter-propagating pump for the signal wavelength, and the chirped fiber gratings permit wavelength control while still allowing for broadband behavior for each Raman cascade order. Hence, the circulator loop design can be low-noise and broadband at the same time. However, the design requires circulators or isolators that provide a sufficient amount of isolation over several Raman orders. Such broadband devices are not available as yet, although they could potentially be composed of a cascade of circulators or isolators operating at each Raman order.

Consequently, there is a need for a Raman oscillator or amplifier would have the best features of all of these designs. The desired attributes for the cavity include:

high-efficiency and low intracavity loss, such as in the grating-based designs;

low-noise performance by using strictly counter-propagating pump and signals, such as in the grating-based ring designs;

broadband designs, such as the Sagnac Raman cavity;

stable wavelength operation, such as in the circulator loop cavity with chirped gratings; and the number of components in the cavity are to be minimized to reduce the intracavity loss and to increase the commercial viability of the design.

One example of a transmission filter is a fiber-based lattice device (c.f., D. A. Nolan, W. J. Miller, and R. Irion, "Fiber-based Band Splitter," Optical Fiber Conference 1998, Technical Digest, pp. 339–340.; D. A. Nolan, "Fiber-Based Lattice Devices," IEEE International Passive Components Workshop, Italy, September 1998). These devices, fabricated using fibers with different propagation constants, are useful for a number of new and growing applications. For instance, fiber-based Mach-Zehnders can be fabricated using two couplers and fibers with different propagation constants. Mach-Zehnders filters have been shown to have sinusoidal pass bands with peaks every 25 nm or 50 nm. These peaks are separated equally in frequency.

Band splitters can be designed through a synthesis of coherent optical delay line circuits. As an example, the addition of a third coupler to the Mach-Zehnder structure enables a fiber-based lattice component capable of splitting bands. By appropriately choosing the coupler values and the magnitude of the optical path length differences between the couplers, wavelength band splitters can be customized. Filters demonstrated include 1480/1550 EDFA pump/gain band filters and 1310/1550 nm band splitters. These filters can be used as WDMs or as in-line filters for spectral shaping.

DISCLOSURE OF INVENTION

It is one object of this invention to provide means for implementing a Raman oscillator in a resonator formed in a linear or ring cavity that uses cascaded Raman distributed gain and an intracavity frequency filter. The attributes of the intracavity filter include:

transmission filter;

pass bands periodic in frequency;

frequency separation of the peaks by 13.2 THz, coinciding with the different Raman cascade orders, or some multiple of this frequency separation;

wide passband for each peak.

It is another object of this invention to provide a means for Raman amplification by using the Raman oscillator to either pump in a counter-propagating fashion an existing transmission link or a Raman gain fiber with one or more isolators.

It is another object of this invention to provide means for a discrete Raman amplifier with counter-propagating geometry for the pump and signal by using either a circulator loop cavity or a ring cavity with an intracavity transmission filter.

It is an object of the present invention to provide a Raman oscillator including an intracavity filter and amplifiers utilizing same wherein linear or ring cavity oscillators using distributed Raman gain are combined with an intracavity frequency filter that is periodic in frequency with peaks corresponding to one or more of the Raman cascade orders.

It is another object of the present invention is to provide a Raman oscillator including an intracavity filter and amplifiers utilizing same wherein Raman oscillators are used with in-line transmission filters to pump a discrete or distributed Raman amplifier for transmission links.

It is yet another object of the present invention to provide a Raman oscillator including an intracavity filter and amplifiers utilizing same wherein discrete Raman amplifiers are implemented in a circulator loop cavity or ring cavity by combining Raman gain and the intracavity transmission filters with a strictly counter-propagating geometry for the pump and signal.

In carrying out the above objects and other objects of the present invention, a Raman oscillator having high efficiency due to low intracavity loss is provided. The oscillator includes at least one laser cavity and a distributed gain medium positioned in the at least one cavity. The oscillator further includes a mechanism adapted to be coupled to a pumping mechanism to pump the distributed gain medium at a pumping wavelength to obtain an optical signal wherein distributed gain is provided by Raman amplification over at least one cascade order corresponding to the pumping wavelength. A filter is positioned in the at least one cavity and includes at least one pass band with a transmission peak placed at the at least one cascade order to filter the optical signal to obtain a filtered optical signal having a signal wavelength. Finally, the oscillator includes an output port for outputting the filtered optical signal.

Preferably, the distributed gain medium is a distributed gain fiber having a single spatial mode over the pumping wavelength to the signal wavelength.

Also, preferably, the filter has an all-glass composition and may be a Mach-Zehnder filter, a low-Q etalon, gratings-separated Fabry-Perots or a fused fiber coupler.

The distributed gain is preferably provided by Raman amplification over a plurality of Raman cascade orders including a final Raman order and the filter has pass bands periodic in frequency with transmission peaks placed at the plurality of cascade orders or multiples of the cascade orders. The transmission peaks placed at the cascade orders are separated by approximately 13.2 THz or some multiple of 13.2 THz or some submultiple of 13.2 THz. The transmission peaks may be separated by two cascade orders.

The distributed gain is preferably provided by Raman amplification over a plurality of cascade orders and the filter may include a band-splitting filter that separates at least one cascade order from at least one other cascade order. The band-splitting filter may separate the pumping wavelength from the signal wavelength.

The oscillator may include a mechanism for splitting the pump wavelength from the signal wavelength outside the at least one cavity wherein the mechanism adapted to be coupled and the output port are combined outside the at least one cavity.

The at least one cavity may be a linear cavity having ends and wherein the filter includes a reflective surface which forms one of the ends of the linear cavity.

The filter may include the mechanism adapted to be coupled.

A coupler may be coupled to the mechanism adapted to be coupled and the output port and may have different periodicity wherein the pumping wavelength and the signal wavelength are separated by a number of cascade orders outside the cavity.

At least one grating may be positioned in the cavity for controlling wavelength of the filtered optical signal. A coupler may be coupled to the mechanism adapted to be coupled and the output port and have different periodicity wherein the pumping wavelength and the signal wavelength are separated by a number of cascade orders outside the cavity.

The cavity may be a ring cavity closed on itself and having a circular cavity geometry. The filter may include an inline periodic filter. The ring cavity may have an arm and wherein fine-tuning elements are positioned in the arm of the ring cavity for fine frequency tuning the filtered optical signal. An isolator may be positioned in the ring cavity to make the ring cavity operate unidirectionally.

The filter may include a many-order periodic filter.

At least one tuning element may be positioned in the cavity for fine frequency tuning the filtered optical signal. The at least one tuning element may comprise a grating, a Fabry-Perot interferometer or a dielectric structure.

Further in carrying out the above objects and other objects of the present invention, in a fiberoptic transmission system including at least one transmission link, an optical amplifier is provided. The amplifier includes an amplifier input port for receiving an optical signal and an amplifier distributed gain medium connected to the amplifier input port to amplify the optical signal. A Raman oscillator, as previously provided, pumps the amplifier distributed gain medium at a pumping level sufficiently high so that the optical signal experiences a gain. An amplifier output port outputs the amplified optical signal.

Preferably, the amplifier distributed gain medium is a gain fiber.

Also, preferably, the gain fiber is pumped in a counter-propagating fashion by the Raman oscillator.

The optical amplifier may be a discrete Raman amplifier which includes at least one isolator and wherein the discrete Raman amplifier is positioned within the at least one transmission link.

The optical amplifier may be a distributed amplifier wherein the at least one transmission link includes a fiber of the amplifier so that the distributed amplifier serves as a low-noise preamplifier.

Still further in carrying out the above objects and other objects of the present invention, in a fiberoptic transmission system, a discrete optical amplifier is provided. The optical amplifier includes an amplifier input port for receiving an optical signal and a Raman oscillator, as previously provided, to pump the distributed gain medium in a counter-propagating fashion at a pumping level sufficiently high so that the optical signal experiences a gain and to provide for cascaded Raman wavelength shifting and wherein the output port outputs the filtered and amplified optical signal.

The ring cavity may have an arm and the optical amplifier further includes fine-tuning elements positioned in the arm of the ring cavity for fine frequency tuning the filtered and amplified optical signal. An isolator may be positioned in the ring cavity to make the ring cavity operate unidirectionally.

Yet still further in carrying out the above objects and other objects of the present invention, in a fiberoptic transmission system, another optical amplifier is provided. The optical amplifier includes an amplifier input port for receiving an optical signal. A Raman oscillator, as previously provided, has a pair of interconnected ring cavities. The distributed gain medium is positioned in each of the ring cavities. The Raman oscillator pumps the distributed gain medium so that the optical signal experiences a gain and to provide for cascaded Raman wavelength shifting. Each cascade order is counter-propagated relative to an adjacent cascade a order. The output port of the Raman oscillator outputs the filtered and amplified output signal.

In accordance with the invention, a Raman oscillator is implemented utilizing distributed Raman gain plus a means of introducing the pump and removing the signal output. An intracavity transmission filter is also used that is periodic in frequency with peaks separated by 13.2 THz and with wide passband for each peak. The transmission peaks are tuned to coincide with the Raman cascade orders corresponding to the pump frequency. A linear cavity design has cavity reflectors formed from coated mirrors or Sagnac loops. A circulator loop cavity design uses an optical circulator to close the loop and provide unidirectional oscillation. The ring cavity design typically uses an optical isolator to provide unidirectional oscillation.

In alternate embodiments, more complicated in-line filters are used to minimize the number of intracavity elements and to increase the cavity efficiency. For example, functions of the intracavity transmission filter can be combined with the means of coupling in the pump and coupling out the signal output. Also, more precise control of the cavity wavelength can be achieved by introducing fine frequency tuning elements such as gratings, Fabry-Perot interferometers or dielectric structures or filters. Moreover, for pump and signal output wavelengths separated by an even number of cascade Raman orders, the cavity may be simplified by using a transmission filter with peaks at alternate Raman orders (i.e., separated by 26.4 THz).

The present invention also relates to implementing Raman amplifiers that are discrete or distributed. Using the Raman oscillator with the in-line filter to pump in a counter-propagating fashion a Raman gain fiber surrounded by one or two isolators and placed within a transmission link forms a discrete amplifier. Alternately, using the Raman oscillator with the in-line filter to pump in a counter-propagating fashion the transmission link directly forms a distributed amplifier. This latter configuration can serve as a low-noise preamplifier and permits graceful upgrade of existing systems.

In other embodiments of the discrete Raman amplifier, the signal is coupled into and out of a circulator loop cavity or the ring cavity design. The pump and signal are strictly counter-propagating, while the same fiber is used to provide for cascaded Raman wavelength shifting as well as Raman amplification of the signal. The amplifier loop also contains the in-line transmission filter and perhaps other fine frequency tuning elements.

The current invention provides for a low-loss linear or ring cavity with a minimum number of intracavity elements, thereby increasing the efficiency and commercial viability of the design. The design uses transmission filters with inherently broad passbands, and the cavities are all-fiber configurations with minimum chance for damage from high pump powers. Furthermore, the in-line filters are preferably mechanically tunable with low temperature sensitivity.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIGS. 2a–2d are graphs which depict the spectra for different designs of intracavity filters; FIG. 2a shows a graph for a periodic transmission filter with peaks at every Raman order separated by 13.2 THz; FIG. 2b shows a graph for a band-splitting filter that separates certain Raman orders from other Raman orders; FIG. 2c shows a graph for the resulting filter function if the filters of FIG. 2a and FIG. 2b are combined; and FIG. 2d shows a graph for a band-splitting filter that separates the pump wavelength from the signal wavelength;

FIGS. 3a and 3b depict the simplest linear cavity Raman oscillators with in-line transmission filters of the present invention; the filter could be a Mach-Zehnder with a spectrum similar to that in FIG. 2a; FIG. 3a illustrates a linear cavity with coated mirror at one end and an output coupler at the other; the output coupler needs to be a mirror for all wavelengths up to the final Raman order; FIG. 3b illustrates a linear cavity where the end mirrors are implemented using Sagnac loops and where a WDM is used to remove the signal output; also, an output coupler needs to be placed at the laser output (i.e., in signal path or between gain fiber and signal output WDM);

FIGS. 4a–4d depict various ways for reducing the intracavity elements in a linear cavity design; WDM1 has a spectrum like the one in FIG. 2b, while WDM2 has a spectrum like the one in FIG. 2d; the in-line filter and WDM1 combined has the spectrum like the one in FIG. 2c; FIG. 4a shows the pump and signal output coupler combined in WDM1, and WDM2 then splits the pump and signal outside the cavity; FIG. 4b shows an HR (high reflection) coating placed on an end portion of the in-line filter to combine the functions of the filter with the end mirror; FIG. 4c shows how the in-line filter and WDM1 functions are combined in a single integrated structure to further reduce the number of intracavity elements; FIG. 4d shows, for more precise frequency control, fine frequency tuning elements such as gratings, Fabry-Perot interferometers or dielectric structures included in the cavity;

FIG. 5a shows a spectrum for the in-line transmission filter; FIG. 5b shows a simplified cavity for pumping at 1117 nm; FIG. 5c shows a simplified cavity for pumping at 1240 nm;

FIG. 6a shows more wavelength control of the cavity presented in FIG. 4b; FIG. 6b shows more wavelength control of the cavity presented in FIG. 5b;

FIG. 7a shows an experimental configuration of a laser cavity; FIG. 7b is a graph of gain versus wavelength measured at amplifier output;

FIG. 8a shows a circulator loop cavity design using an in-line frequency filter; FIG. 8b shows a circulator loop cavity design with an in-line filter and other possibly reflective fine tuning filters placed in one arm of the circulator; FIG. 8c shows a ring cavity design using the in-line filter and an isolator to make the cavity operate unidirectionally;

FIGS. 9a–9d depict various graphs and cavity designs of Raman oscillators made from many-order periodic filters; FIG. 9a shows a graph for the one-peak per order filter of FIG. 2a, along with filter passbands for two-peak and four-peak per order filters; FIGS. 9b–9d show different laser cavities enabled by using many-order, periodic filters;

FIG. 10a shows a discrete amplifier with a gain fiber and an isolator placed within a transmission link; FIG. 10b shows a distributed amplifier that uses Raman amplification in the transmission link fiber itself; this can serve as a low-noise pre-amplifier and provides a means of graceful upgrade to transmission systems;

FIG. 11a shows a circulator loop cavity design with an in-line filter; FIG. 11b shows a circulator loop cavity with an in-line filter and other, possibly reflective, fine-tune filters placed in one arm of the circulator; FIG. 11c shows a ring cavity design using the in-line filter and an isolator for unidirectional pumping.

BEST MODE FOR CARRYING OUT THE INVENTION

Figure 1:
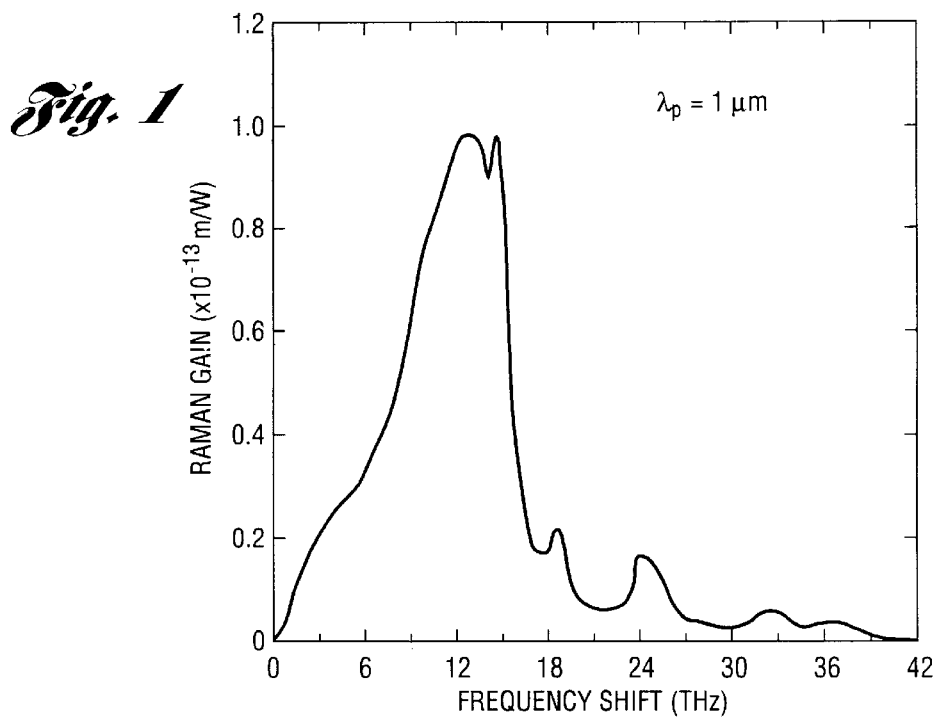
FIG. 1 is a graph which depicts the measured Raman gain spectrum for fused silica at a pump wavelength of 1000 mn.

The present invention relates to a simple Raman oscillator cavity that uses distributed Raman gain over several cascade orders and an in-line transmission filter with peaks coinciding with the various Raman orders. The in-line transmission filter is periodic in frequency pass bands, and it is desirable to have a wide passband for each peak. The Raman oscillators can be linear cavity or ring cavity designs. The linear cavity designs can have higher pumping efficiency and the cavity ends can be formed by coated mirrors or Sagnac loops. However, the ring cavity designs do not require reflective ends and can require fewer intra-cavity elements. Means for achieving the ring cavity designs include circulator loop cavities or ring cavities with isolators, both with an intracavity transmission filter.

More specifically, the Raman oscillator includes a ring cavity closed on itself or a linear cavity formed between reflective elements. Ports are included for introducing the pump and for exiting the signal output. The cavity contains a gain fiber, where distributed gain is provided by Raman amplification over several orders. The fiber should be single spatial mode over wavelengths from the pump to the signal output wavelength. Included in the cavity is a intra-cavity frequency filter that operates in transmission mode, that is, periodic in frequency, that has transmission peaks corresponding to various Raman orders separated by 13.2 THz, and that has a wide passband for each peak.

A first embodiment of the Raman oscillator uses a linear cavity. The reflective ends can be formed from coated surfaces or Sagnac loops, and WDMs are used for bringing in the pump and removing the signal output. A length of gain fiber is included in the cavity for Raman amplification, and the intracavity transmission filter is tuned to coincide to the Raman orders corresponding to the pumping wavelength. The number of elements in the cavity can be reduced by making more complicated in-line filters and by combining with some of the WDM functions. Also, the pump and signals can be separated outside the cavity. For pump and signal wavelengths separated by an even number of Raman orders, simpler cavity designs may also result from using filters with peaks separated by two Raman orders.

Another embodiment of the Raman oscillator uses a ring cavity. Wrapping the Raman gain fiber and intracavity filter around and connecting to two ports of the circulator forms a circulator loop cavity. Alternately, the gain fiber can be connected to two ports of the circulator, and the in-line filter along with any fine frequency tuning elements can be attached to the third port of the circulator. A ring cavity design wraps the gain fiber and intracavity filter on a loop and inserts an isolator to insure unidirectional operation.

The present invention also relates to implementation of discrete or distributed amplifiers either pumped by or integrated into the Raman oscillators with transmission filters. The simplest discrete amplifier uses a gain fiber and isolator pumped by the Raman oscillator. Alternately, a distributed amplifier can be implemented by using the Raman oscillator with in-line filter to pump the transmission line fiber itself. Discrete Raman amplifiers with strictly counter-propagating pump and signal can also be made by combining the ring cavity designs of the Raman oscillators with a mechanism for inserting the signal.

To provide a better understanding of the amplification mechanisms and nonlinearities at work in the present invention, stimulated Raman scattering, Raman cascading and transmission filter designs are described. Stimulated Raman scattering effect is the result of third-order nonlinearities that occur when a dielectric material such as an optical fiber is exposed to intense light. The third order nonlinear effect is proportional to the instantaneous light intensity.

Stimulated Raman Scattering

Stimulated Raman scattering is an important nonlinear process that turns optical fibers into amplifiers and tunable lasers. Raman gain results from the interaction of intense light with optical phonons in silica fibers, and Raman effect leads to a transfer of energy from one optical beam (the pump) to another optical beam (the signal). The signal is downshifted in frequency (or upshifted in wavelength) by an amount determined by vibrational modes of silica fibers. The Raman gain coefficient, $g_r$, for the silica fibers is shown in FIG. 1. Notably, the Raman gain, $g_r$, extends over a large frequency range (up to 40 THz) with a broad peak centered at 13.2 THz (corresponding to a wavelength of 440 nm). This behavior over the large frequency range is due to the amorphous nature of the silica glass and enables the Raman effect to be used in broadband amplifiers. The Raman gain also depends on the composition of the fiber core and can vary with different dopant concentrations.

Raman amplification has some attractive features. First, Raman gain is a good candidate for upgrading existing fiber optic links because it is based on the interaction of pump light with optical phonons in the existing fibers. Second, there is no excessive loss in the absence of pump power—an important consideration for system reliability.

Raman Cascading

Cascading is the mechanism by which optical energy at the pump wavelength is transferred, through a series of nonlinear polarizations, to an optical signal at a longer wavelength. Each nonlinear polarization of the dielectric produces a molecular vibrational state corresponding to a wavelength that is offset from the wavelength of the light that produced the stimulation. The nonlinear polarization effect is distributed throughout the dielectric, resulting in a cascading series of wavelength shifts as energy at one wavelength excites a vibrational mode that produces light at a longer wavelength. This process can cascade through numerous orders. Because the Raman gain profile has a peak centered at 13.2 THz in silica fibers, one Raman order can be arranged to be separated from the previous order by 13.2 THz. As an example, the wavelengths for different Raman orders corresponding to a pump at 1117 nm are included in Table 1 as follows:

TABLE 1

| Wavelength of Cascaded Raman Orders (nm) | Δλ (nm) = 13.2 THz |
|---|---|
| 1117.00 | 57.74 |
| 1174.74 | 64.03 |
| 1238.77 | 71.41 |
| 1310.18 | 80.15 |
| 1390.33 | 90.59 |
| 1480.92 | 103.22 |
| 1584.15 | 118.69 |

Cascading makes stimulated Raman scattering amplifiers very desirable. Raman amplification itself can be used to amplify multiple wavelengths (as in wavelength division multiplexing) or short optical pulses because the gain spectrum is very broad (a bandwidth of greater than 5 THz around the peak at 13.2 THz). Moreover, cascading enables Raman amplification over a wide range of different wavelengths. By varying the pump wavelength or by using cascaded orders of Raman gain, the gain can be provided over the entire telecommunications window between 1300 nm and 1600 nm. Hence, cascaded Raman orders provide an efficient means by which to accomplish frequency shifting from a strong pump to any desired wavelength to the longer wavelength side.

Periodic Transmission Filters

Optical delay line circuits made in fibers are being used for wavelength selective elements such as 1300/1550 nm band splatters, 1480/1550 nm wide band multiplexers, and gain flattening elements. The simplest optical delay line circuit is the Mach-Zehnder interferometer, which consists of two coupling regions surrounding a phase shifting section. The frequency response for the Mach-Zehnder interferometer is sinusoidal in frequency, and the separation of the peaks is adjusted by adjusting the length of the phase shifting region (i.e., the shorter the phase shifting region, the further apart the peaks in frequency). The addition of a third coupler to the Mach-Zehnder structure enables a fiber-based lattice component capable of splitting bands. By appropriately choosing the coupler values and the magnitude of the optical path length differences between the couplers, wavelength band splitters can be customized.

These interferometric couplers are fabricated by inserting two fibers of differing propagation constants into a boron-doped silica tube. The outer tube is collapsed onto the fibers, and the tube is tapered at the appropriate locations to induce the desired coupling (for more details, refer to D. A. Nolan, W. J. Miller, and R. Irion, "Fiber-based band splitter," Optical Fiber Conference 1998, Technical Digest, pp. 339–340). One key point is that stable delay line circuits can be fabricated when the fibers with different propagation constants remain in physical contact. Physical contact of the fibers prevents differential bending and differential thermal fluctuations between the cores. Also, these components can be tuned in a controlled fashion by bending the phase-shifting regions between the couplers or the couplers themselves (c.f., D. A. Nolan, "Fiber-based lattice devices," IEEE International Passive Components Workshop, Italy, September 1998).

Thus, advantages of using such filters as the transmission filters in the Raman oscillators include:

Low insertion loss. Can be less than 0.5 dB for Mach-Zehnder devices and less than 1.5 dB for lattice devices with three couplers.

Broadband. For example, the Mach-Zehnder just has a sinusoidal frequency response.

Low temperature dependence. Since two fibers are in contact and are of the same length, a minor thermal differential effect occurs.

Mechanically tunable. The peak of the filter can be tuned by bending the structure in a controlled fashion.

Ability to handle high pump powers. Since these devices are all fiber couplers, they are less prone to damage at high powers.

In addition, there are alternate means of implementing a transmission filter that has periodic pass bands in frequency. For example, an etalon can be used, which has two reflective coatings surrounding a gap region. The reflectivity of the coatings should be low to allow for a low-Q (quality factor) and, hence, a broadband transmission peak. If the gap material has an index-of-refraction n, then the length of the gap region should be for normal incidence, $L=c/(2\times n\times \Delta v)$, where $\Delta v=13.2$ THz. If the gap region is glass with n=1.5, then L=7.58 microns.

As a second example, a Fabry-Perot interferometer can be made, which consists of two mirrors with a gap between them. The reflectivity of the mirrors should be low, and the gap region for air should be $L=c/(2\times \Delta v)=11.36$ microns. Alternately, the Fabry-Perot can be formed by using two gratings with a fiber gap between them.

Crafting the Transmission Filter for Raman Oscillators

The Mach-Zehnder type filters, as well as the low-Q etalons or grating-separated Fabry-Perots or fused fiber couplers, can be used advantageously for the in-line transmission filter required for the Raman oscillators. In particular, the sinusoidal transmission function can be used by placing the transmission peaks at each of the cascade Raman orders or multiples of the cascade orders. Such a periodic filter should be easy to implement, as it only requires two couplers surrounding a phase shift section of the proper length. One nice feature of such a sinusoidal filter function is that the various pass bands can be broad. A key feature of Raman gain is that the gain spectrum follows the pump spectrum and broadens at each consecutive order. Since the Raman orders can broaden with the sinusoidal filter function, a broadband gain can result at the output wavelength.

Figure 2A:
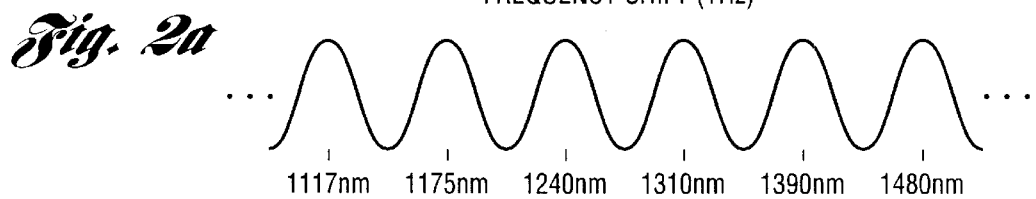

As an illustration, consider a case with a pump at 1117 nm and the signal output at 1390 nm (for the intermediate Raman orders refer to Table 1). FIG. 2a shows the desired transmission function for the filter, where the peaks of the sinusoid fall at 1117 nm, 1175 nm, 1240 nm, 1310 nm, and 1390 nm. This means that all of the desired Raman orders will appear at the same port at the filter output, which will be connected to the intracavity fiber path.

Figure 2B:
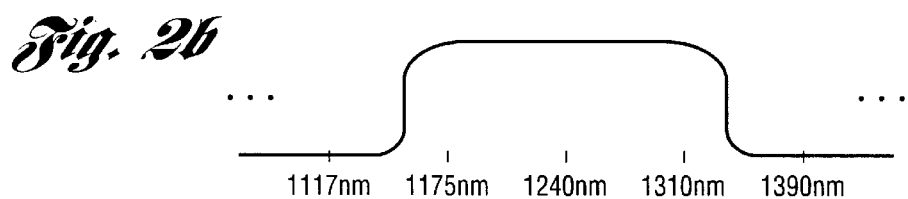
Figure 2C:
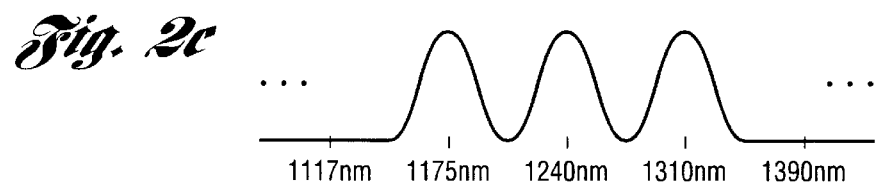
Figure 2B:
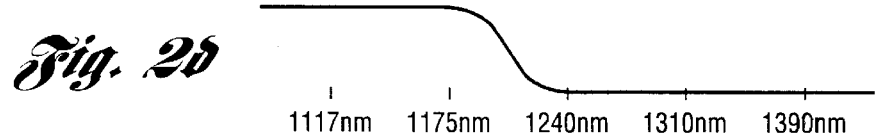

Cascading filters might also implement more complicated filter functions. For example, it could be desirable to have a filter as shown in FIG. 2b, where the pump and signal bands are separated from the intermediate cascade orders. Alternately, the filter bandpasses of FIG. 2a and FIG. 2b could be combined, as shown in FIG. 2c. This is desirable so that all the intermediate Raman orders remain within the cavity, while the input and output wavelengths are separated. Hence, the input and output WDM coupler functions can be combined with the transmission filter function. Finally, a band splitter such as shown in FIG. 2d could be useful for separating the pump wavelength from the signal wavelength. Combined with the filter function of FIG. 2c, this band splitter could be used external the cavity to separate the input pump from the output signal.

Figure 3A:
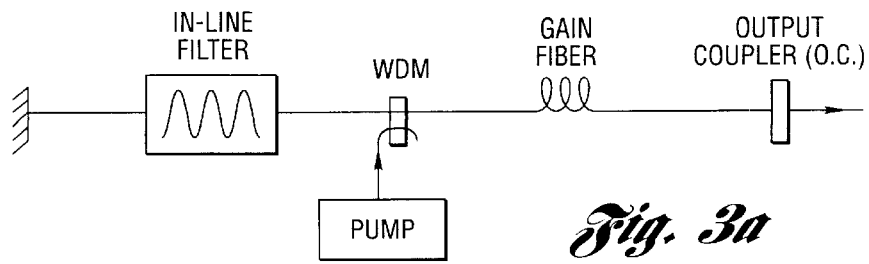

Preferred Embodiments of Linear Cavity Raman Oscillator Using In-Line Periodic Filters The basic structure of the invention is shown in FIG. 3a for a linear cavity Raman laser. The Raman oscillator is formed between two reflective structures: on the left is a high-reflection mirror, while on the right is the partially transmitting output coupler. The output coupler needs to be a mirror for all wavelengths up to the final Raman order. In this and further designs, the output or WDM must stop the Raman cascade from progressing beyond the output wavelength by making sure that there is no optical cavity at longer wavelengths. The laser cavity consists of a gain fiber, which is a distributed gain medium that permits cascaded Raman amplification. Also included is a WDM coupler that transmits the signal and cascade Raman orders but couples over the pump wavelength. Finally, an intracavity frequency filter is placed within the oscillator. This is a transmission filter that is periodic in frequency. Nominally, the separation of the transmission peaks should be 13.2 THz, and the peaks should be tuned to the cascade Raman orders corresponding to the pump wavelength. Also, it is desired that the filtering is a low-Q filter so that each passband has a wide frequency range, thus permitting broadband Raman oscillation.

Figure 3B:
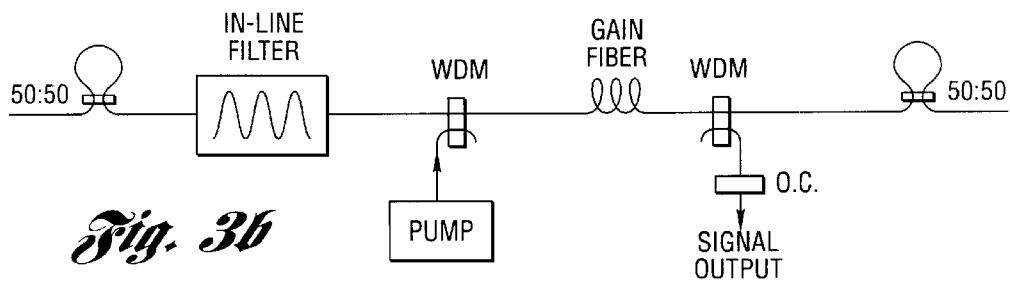

Variations on this basic structure are also possible, depending on practical details and availability of components. For example, FIG. 3b shows an alternate configuration for the linear cavity resonator. The cavity is formed between two high reflection Sagnac mirrors, which are formed by using a 50:50 coupler with two ends connected by fiber. The Sagnac interferometer mirrors have the advantage that they are all-fiber structures that are less prone to damage at high powers (c.f. U.S. Pat. No. 5,778,014). A separate WDM is used to remove from the cavity the signal output. Also, an output coupler needs to be placed at the laser output (i.e., in signal path or between gain fiber and signal output WDM). For the configuration of FIG. 3b, each necessary function is implemented with an individual element. Hence, each element can be optimized separately. In addition, it may be desirable to increase the efficiency of the signal output by removing part of the output and returning the remainder as feedback into the cavity. This can be accomplished by placing a partially transmitting output coupler at the signal output port external to the cavity. Exemplary output couplers include a partially transmitting mirror, a dielectric filter, or a fiber grating.

The advantages of the Raman oscillator design based on an intracavity periodic transmission filter include:
- simple cavity with one low-loss element inserted.
- broadband cavity design because of the sinusoidal pass band. For example, the bandwidth would be wider than permitted by designs using reflection gratings.
- in-line filter can be tuned mechanically to align with the Raman cascade orders.
- an all-fiber configuration where the light stays in the fiber throughout the cavity and there is less chance of damage from high pump powers.

The requirements on the in-line filter should include:
- transmission filter with fiber pig-tails
- periodic filter with peaks evenly spaced in frequency corresponding to 13.2 THz
- low-Q filter with wide band pass spectra
- tunable so that the peaks can be aligned with the cascade Raman orders corresponding to the pump wavelength.
- low insertion loss fiber-to-fiber (less than 1.5 dB)
- broadband filter that operates from the pump wavelength to the signal output wavelength. For example, the range might be 1100 to 1500 nm or 1300 to 1600 nm.
- able to handle high powers. For example, the pump can be as much as 1 to 2 W continuous wave.

Therefore, the Mach-Zehnder filters and lattice devices described earlier are candidate filters for the Raman oscillators, as are the low-Q etalons or grating-separated Fabry-Perots.

Minimizing Introcavity Components Using More Complicated Filter Functions

Figure 4A:
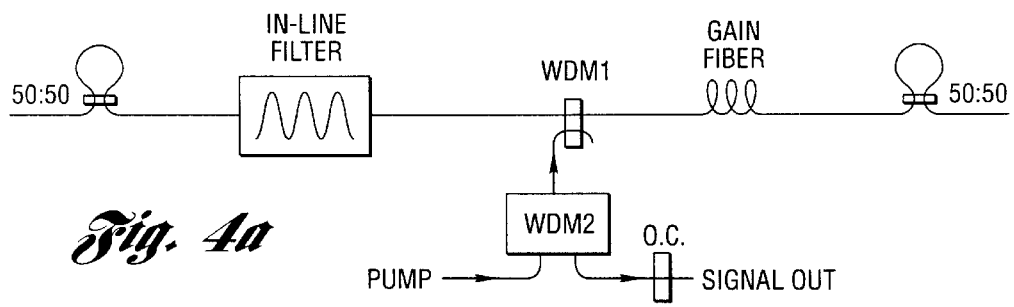
Figure 4B:
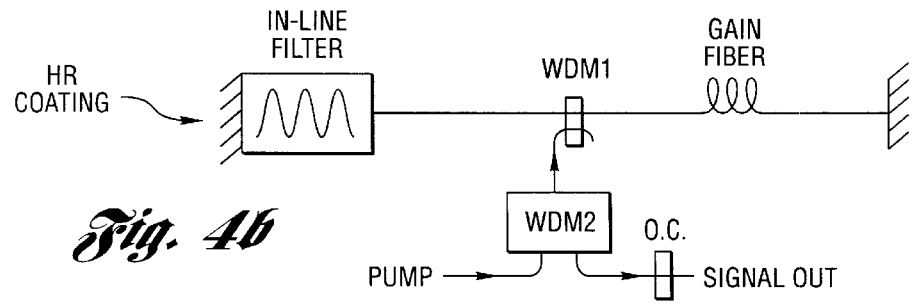

To maximize the cavity efficiency, the desire would be to minimize the number of intracavity elements. The minimum number of elements would also increase the commercial viability of the design. The number of elements in the cavity can be reduced using more complicated filter or WDM designs. For example, as shown in FIG. 4a, the cavity of FIG. 3b can be simplified by using WDM1, which would have the spectral characteristics of FIG. 2b, to add and remove the pump and signal output wavelengths. Then, WDM2, which would have the spectral characteristics of FIG. 2d, can be used external to the cavity to separate the pump input and signal output. Alternately, the cavity of FIG. 3a is simplified in FIG. 4b by using WDM1 and by also placing a high-reflection (HR) coating on one surface of the in-line filter. The other end of the cavity can use a similarly coated mirror or a Sagnac mirror.

Figure 4C:
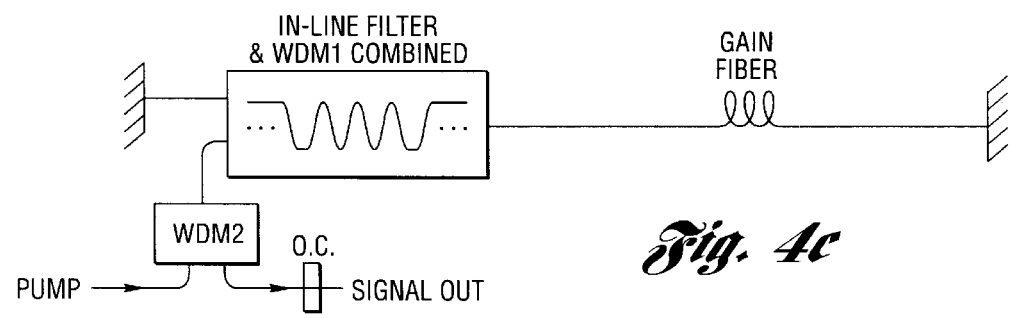
Figure 4B:
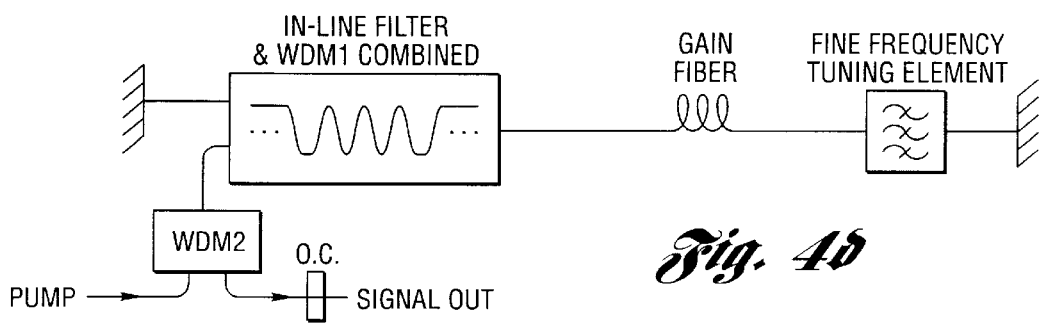

Further reduction of the number of cavity components requires making more complicated filter designs without substantially increasing the filter insertion loss. An exemplary cavity design is shown in FIG. 4c, where the in-line filter and WDM1 functions are combined. The filter transmission spectrum would resemble FIG. 2c, so that the intermediate cascade Raman orders remain within the cavity while the pump and signal wavelengths are removed from the cavity. The pump and signal output are then separated using WDM2 external to the cavity. Furthermore, if more precise control of the cavity frequency is desired, then other fine frequency tuning elements can be placed in the cavity as well (FIG. 4d). Such frequency tuning elements include: (a) other Mach-Zehnder or delay line filters; (b) reflective filters such as gratings; (c) broader band reflective filters such as chirped period gratings; (d) Fabry-Perot interferometer filters; or (e) dielectric filters.

Figure 5A:
FIGS. 5a–5c depict a spectrum and modified designs using couplers with different periodicity (i.e., peaks at alternate Raman orders); these designs could be simpler when the pump and signal are separated by an even number of Raman orders; as an example, a linear cavity design is illustrated with pumping at 1117 nm or 1240 nm and Raman oscillator output at 1390 nm.

Although all of the above Raman oscillator examples rely on use of a transmission filter with peaks at every Raman cascade order, it may occasionally be desirable to use a filter with pass bands at some multiple of the cascade Raman orders. In particular, if the pump wavelength and signal output wavelength are separated by an even number of Raman cascade orders, then it may be more beneficial to have a filter with peaks at alternate Raman cascade orders (i.e., peak separation of 26.4 THz). As a specific illustration, consider an example where the pump is either at 1117 nm or 1240 nm and a signal output near 1390 nm is desired. Then, wavelengths 1117 nm, 1240 nm and 1390 nm appear at one arm, while 1175 nm and 1310 nm appear in the other arm of the filter. In other words, the pump and signal emerge from the same port, while intermediate Raman orders emerge from the other port. FIG. 5a shows the transmission spectrum of the filter with peaks at alternate Raman cascade orders. For example, this function can be made using a similar Mach-Zehnder filter as used in FIG. 2a except with the phaseshift arms halved in length. Note the additional advantage that the pass band is also doubled in width.

Figure 5B:
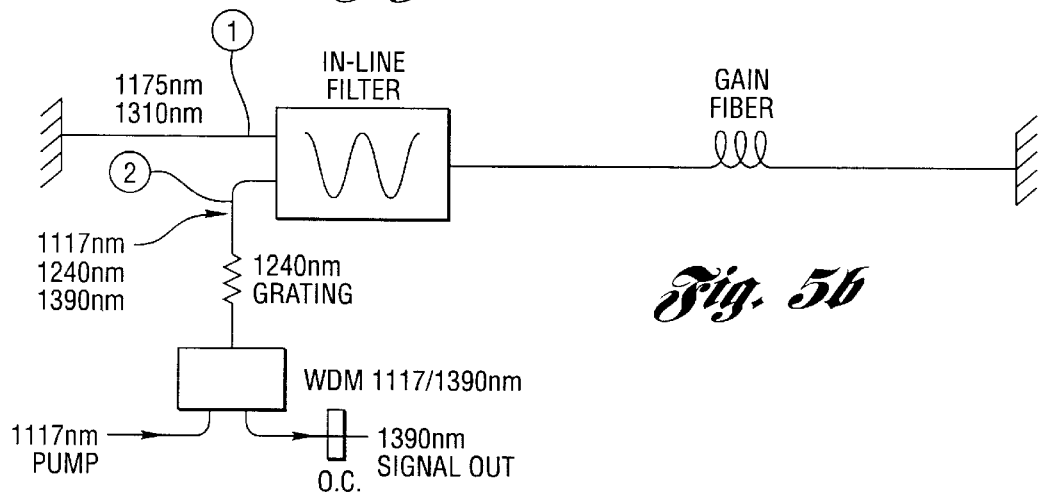
Figure 5C:
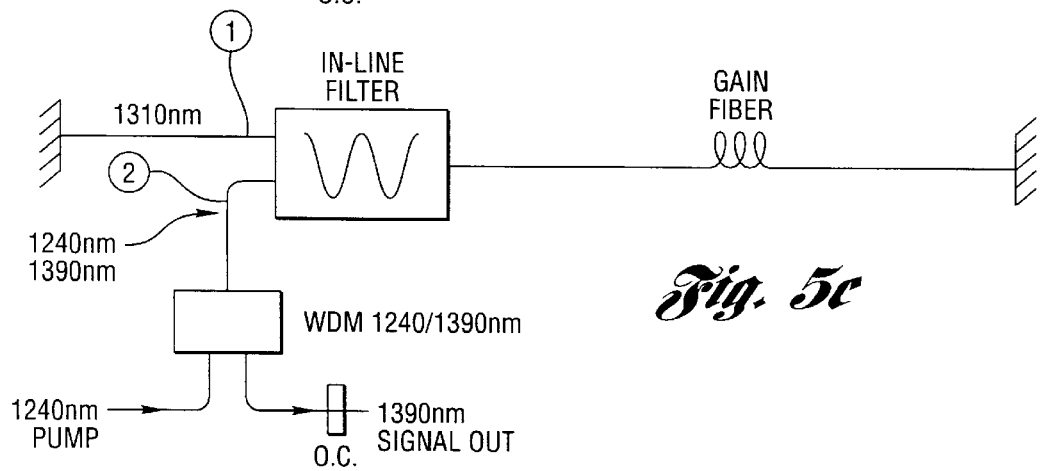

To illustrate the cavity designs, FIG. 5b shows the cavity when the pump is at 1117 nm, while FIG. 5c shows the cavity when the pump is at 1240 nm. The 1117 nm pump light might come from a cladding-pumped fiber laser or any laser using ytterbium-doped material. As in FIG. 4c, the in-line filter and WDML function are effectively combined in one periodic filter structure. Then, another WDM external to the cavity can be used to separate the pump input from the signal output. Note that in FIG. 5b one of the intermediate orders at 1240 nm is also removed from the cavity, and this must be re-inserted to insure proper cascading to 1310 nm and 1390 nm. Therefore, a grating, chirped period grating or dichroic mirror reflecting at 1240 nm must be used between the filter and WDM. This is not a problem for FIG. 5c, since the only intermediate order at 1310 nm is kept within the cavity. Finally, it should be clear that the efficiency of any of the cavity designs in FIGS. 4 or 5 can be improved by placing a partially transmitting output coupler or grating at the signal output port to feedback a part of the output as a seed to the cavity. In addition, for these cavities it may also be desirable to place an additional intracavity filter that blocks any further cascading to the next Raman order beyond the signal output (i.e., for this example an intracavity filter that blocks lasing near 1480 nm).

Need for Further Wavelength Control

Figure 6A:
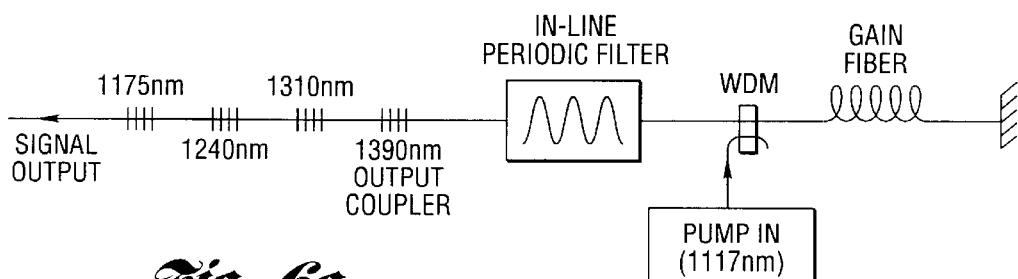
FIGS. 6a–6b depict designs of Raman cavities with further wavelength control; in particular, gratings are used to replace a high reflectivity mirror in the cavity.

Depending on the application, one problem for the configurations in FIGS. 3–5 is that further wavelength control may be necessary. The stricter wavelength control can be achieved by replacing one end mirror of the cavities in FIGS. 3–5 with a periodic filter with appropriate gratings. This configuration also has the advantage that it eliminates the need to stop the cascade and can output couple through gratings without needing a WDM in many configurations. As an example, the configuration in FIG. 4b can have stricter wavelength control by using the alternate configuration in FIG. 6a. The mirror on the left side of FIG. 4b is replaced by gratings, and a partially reflecting grating is also used as the output coupler.

The use of the gratings may be more appropriate in the configurations similar to FIG. 5, where the coupler can bypass some grating losses at the signal and output wavelengths. This can be particularly important when one of the wavelength passes between 1370–1430 nm, where there is loss associated with the water absorption in fibers. For instance, FIG. 5b can be replaced with the configuration in FIG. 6b, where loss due to the 1175 and 1310 nm gratings is avoided at the 1390 nm output wavelength. Moreover, the gratings can also be used to pull the output wavelengths to the desired operating wavelengths if the coupler periodicity is not uniform or the desired wavelengths are not uniform. This can relax the coupler requirements for achieving a desired design.

Figure 6B:
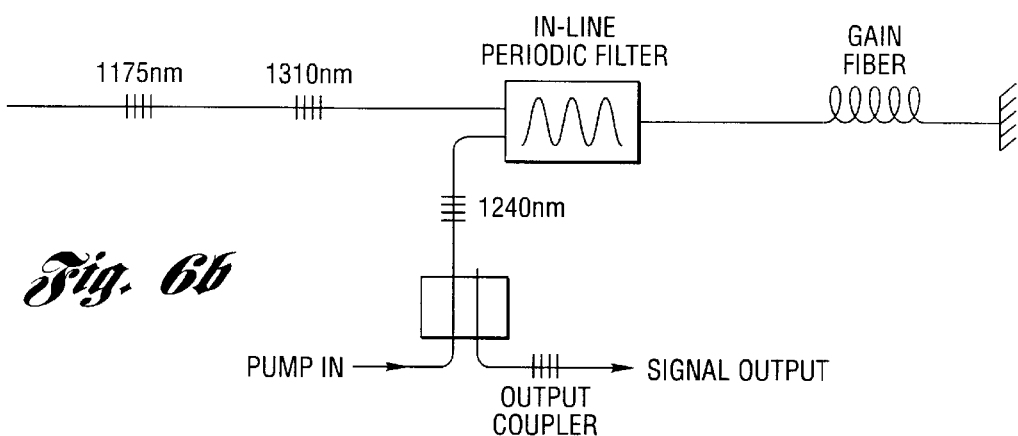
Figure 7A:
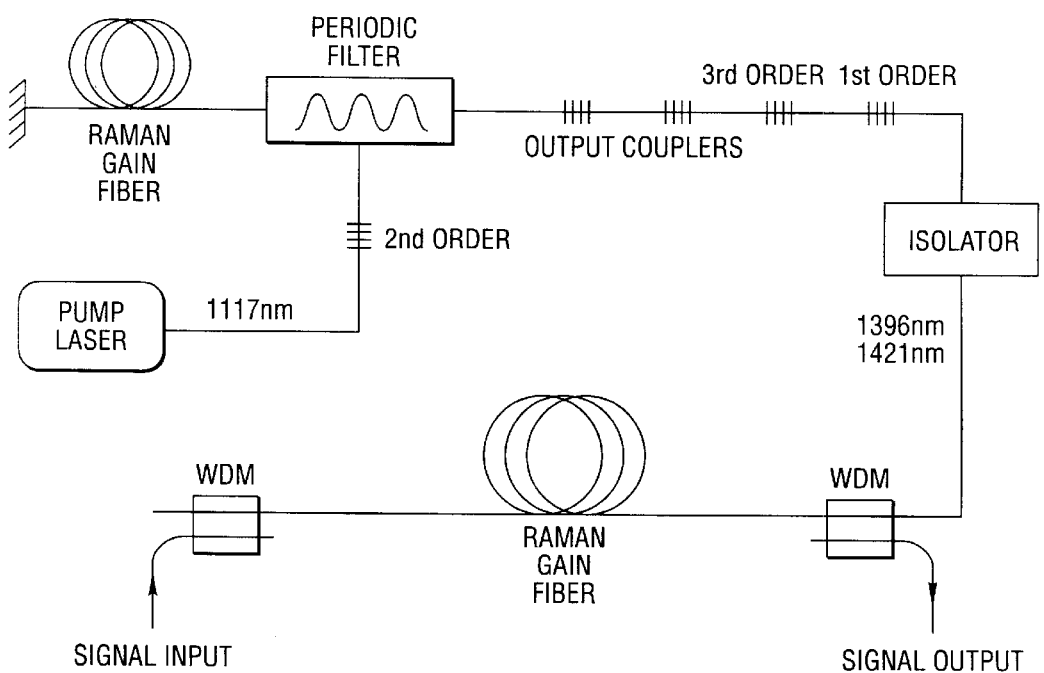
FIGS. 7a–7b depict an experimental configuration and the experimental results for a Raman laser cavity using an in-line periodic filter and gratings for wavelength control.
Figure 7B:
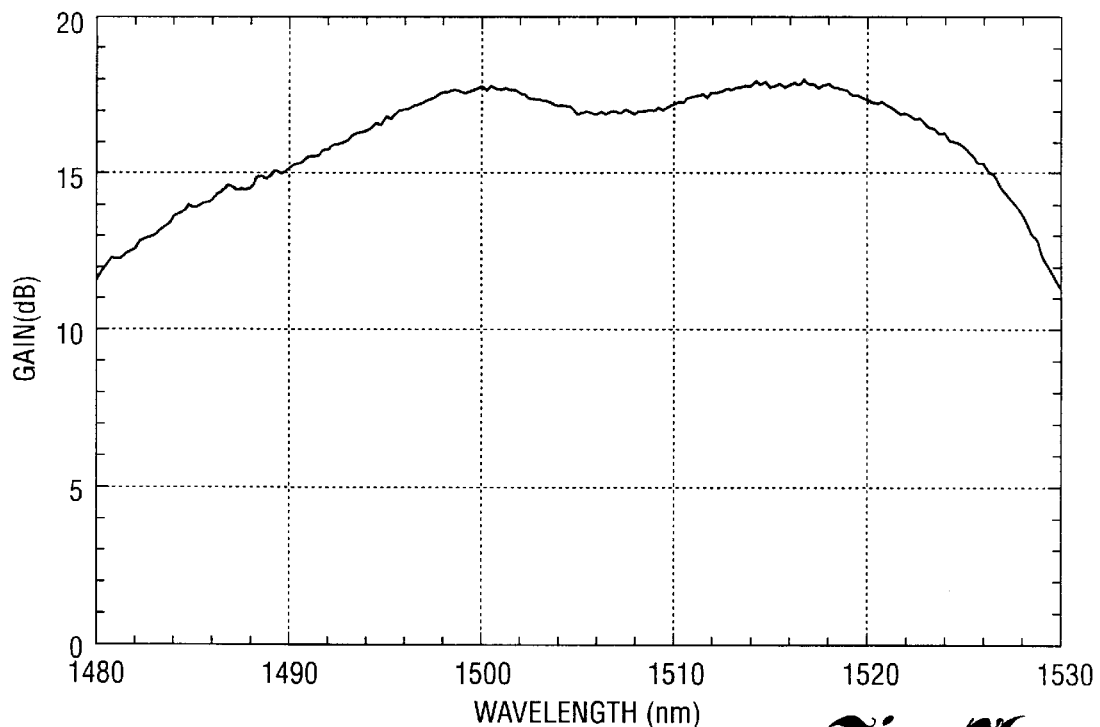

As an example, an amplifier similar to FIG. 6b was constructed for operation as an amplifier in the S-band (between 1480 and 1530 nm). The configuration for the amplifier is shown in FIG. 7a. The experimentally measured gain versus wavelength for this amplifier is shown in FIG. 7b. The peak gain of 18 dB includes 6 dB of loss for the built-in dispersion compensation (compensation for 60 km of standard fiber). The 3 dB bandwidth of the amplifier is 37 nm (1489–1526 nm), and the 1 dB bandwidth is 26 nm (1496–1522 nm flatband without any gain flattening elements). The maximum signal output power is >25 dBm, and the optical noise figure is <6 dB.

Preferred Embodiments of Ring Cavity Designs Using Intracavity Transmission Filters To minimize damage from reflective end cavity mirrors, it is often advantageous to use ring cavity designs rather than linear cavity oscillators. Also, the ring cavity designs lead naturally to amplifier designs, as discussed further in the next section. One drawback could be that the ring may have one-half the efficiency of the linear cavity since the pump only propagates in one direction. This shortcoming, however, may be partially compensated by the minimum number of intracavity elements required in a ring design.

The above-noted U.S. patent application No. 60/120,408 filed Feb. 12, 1999 describes circulator loop cavities formed by looping the gain fiber around an optical circulator. Optical circulators are 3-port coupling devices that are made to be polarization independent and with low insertion loss. Also, optical circulators are based on optical isolator technology, which is well-established. In particular, optical circulators are nonreciprocal devices that redirect light from port to port sequentially in only one direction. Input from port 1 is redirected to port 2 (numbering of ports starts at the upper left hand corner and sequences in a clockwise fashion). However, a reverse signal entering port 2 totally transmits to port 3 as a usable signal. Ports 1 and 3 are completely isolated.

Figure 8A:
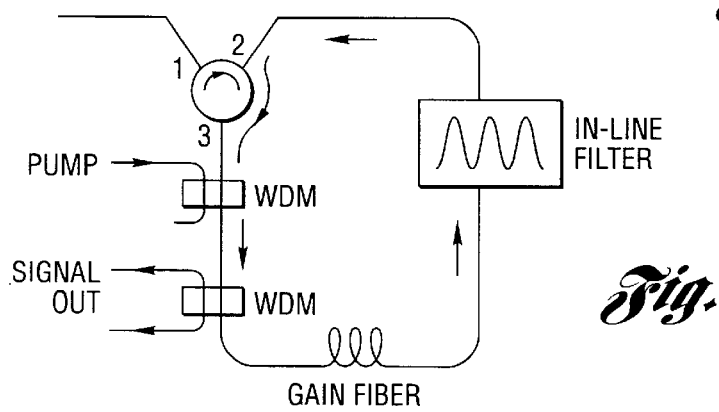
FIGS. 8a–8c depict various ring cavity designs of Raman oscillators using intracavity transmission filters.

FIG. 8a illustrates a circulator loop cavity modified to include the in-line transmission filter. This configuration is analogous to the linear cavity of FIG. 3, and the same type of transmission filter is used. To reduce the cross-talk from the pump fluctuations to the signal, the various Raman orders should propagate in the opposite direction to the signal. A circulator loop cavity can be used to guarantee that the pumps and signal are counter-propagating. Two ports of the circulator (ports 2 and 3) are connected by a length of Raman gain fiber. The pump wavelength is introduced in the counter-clockwise direction using a WDM coupler. This coupler should transfer over the pump wavelength while passing through the cascade Raman orders and the signal wavelength. The pump and various cascade Raman orders circulate in the counter-clockwise direction around the loop. The signal traverses the circulator loop in the clockwise direction, opposite to the pump and the various cascade Raman orders. Finally, a WDM is used to remove the signal. In all of the configurations of FIG. 8, this WDM should be a partially coupling WDM for the laser output coupler. The output WDM must also stop the Raman cascade from progressing beyond the output wavelength by making sure that there is no optical cavity at longer wavelengths.

Figure 8B:
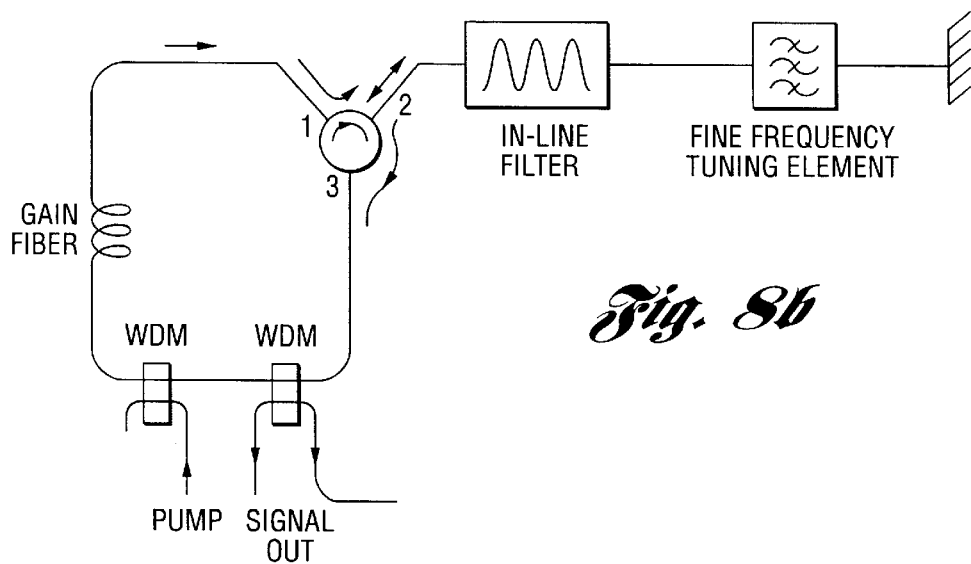

Since the in-line filter is quite broadband, it may be desirable to have more precise frequency control of the cavity using more fine frequency tuning elements. FIG. 8b illustrates one means of combining the circulator loop cavity with the in-line filter and fine tuning elements, such as a series of reflection-mode chirped Bragg gratings. Unlike FIG. 8a, the length of Raman gain fiber is now connected between ports 1 and 3 of the circulator, and the pumps now rotate in the clockwise direction. The filter and tuning elements are spliced to port 2 of the resonator. The pump power is coupled in to propagate in the clockwise direction using a WDM at the bottom end of the Raman gain fiber. The signal is removed by lacing a WDM at the end of the Raman gain fiber.

Figure 8C:
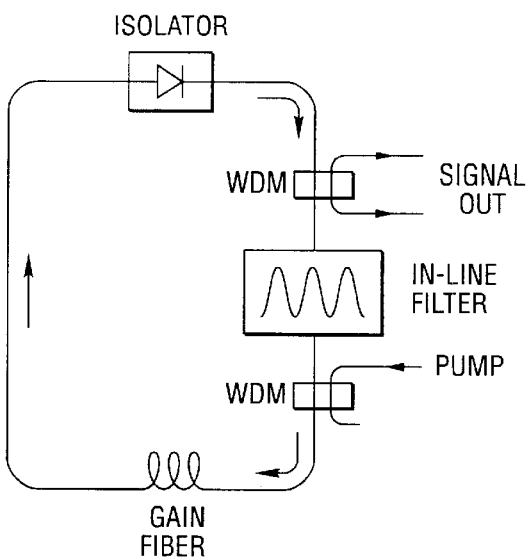

Similar to the configuration of FIG. 8a, placing an isolator within a ring configuration can also form a unidirectional ring cavity. For example, FIG. 8c illustrates a simple ring cavity with the in-line transmission filter. Once again, WDM couplers are used to insert the pump and remove the signal output. The isolator is used to have the pump and cascaded Raman orders rotate in the clockwise direction, while the signal output is taken from the counter-clockwise direction.

The circulator or isolator elements should be broad band enough to operate properly at the pump and cascade Raman order wavelengths. Also, they must be able to withstand the power levels of the pump beam. Since the non-reciprocal element used in circulators and isolators is typically wavelength dependent, it may be difficult to make them extremely broadband. An alternative may be to use multi-stage circulators or isolators, where each stage operates at one of the Raman cascade orders.

Finally, it should be clear that improvements such as illustrated in FIGS. 4 and 5 can also be applied to the ring cavity designs of FIG. 8. These improvements can further reduce the number of intracavity elements, thereby increasing the finesse and efficiency of the ring cavity designs. Also, if it is not critical that the signal be counter-propagating to the pump and various Raman cascade orders, then the isolator in FIG. 8c can be removed from the cavity. For this configuration, further efficiency gains may also be made by feeding back a fraction of the signal output using a partially transmitting output coupler. In this case, it may also be desirable to use an intracavity filter to prevent lasing at Raman orders beyond the output wavelength.

Higher Periodicity WDM's

Although WDM's with peaks every or every other Raman order have been described thus far, there can also be advantages in using higher periodicity WDM'S. Possible advantages of using higher periodicity WDM's include:

tighter spectral control.

allows for multiple discrete output wavelengths within a particular Raman order. For example, four peaks per Raman order can be used for flatter gain spectrum.

variations in periodicity with wavelength do not have as large an impact on the units efficiency.

the cavity design could potentially be simplified. For example, the periodic filter can be used as a pump and perhaps signal WDM by not perfectly aligning the peaks with the Raman orders (i.e., pump and 1st cascade can be half a period separated for WDM elimination).

Figure 9A:
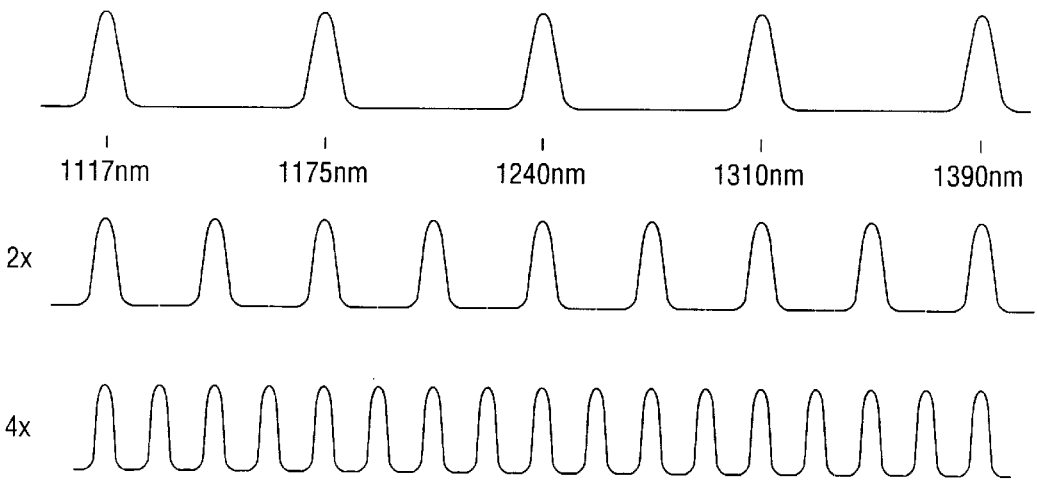
Figure 9B:
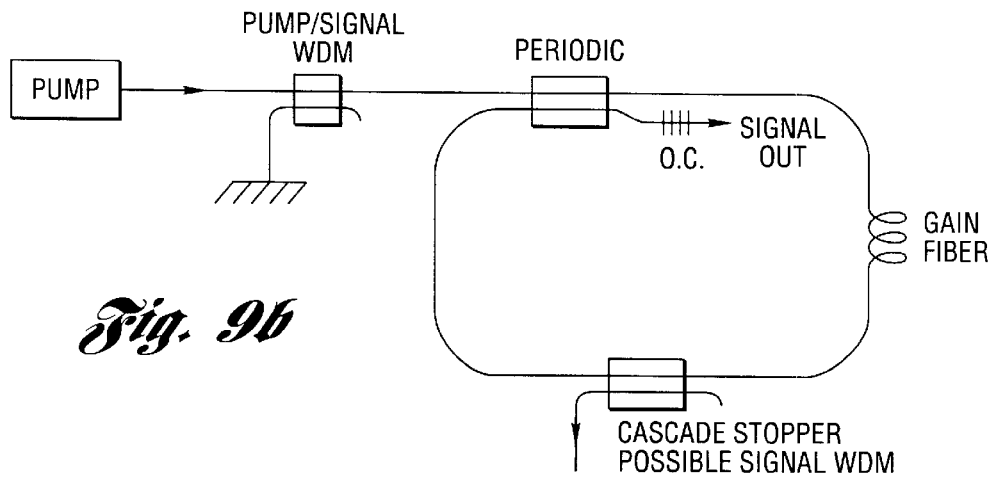
Figure 9C:
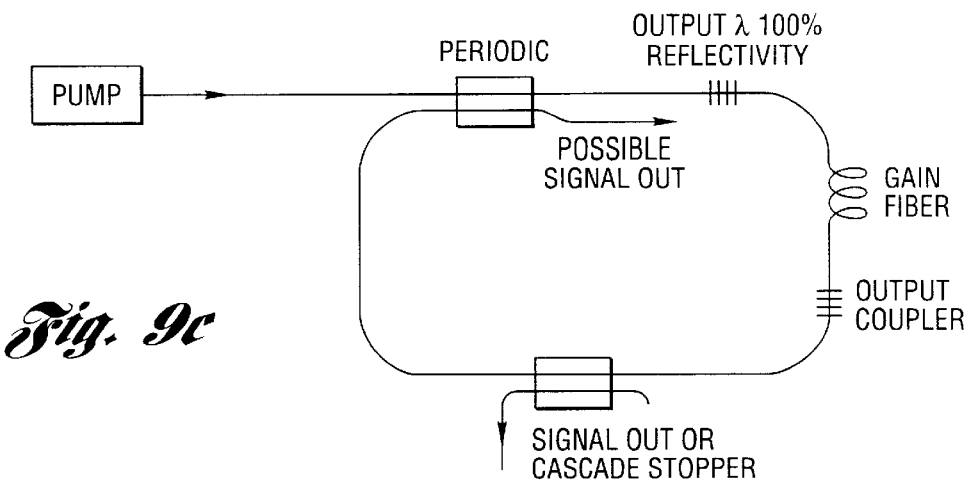
Figure 9B:
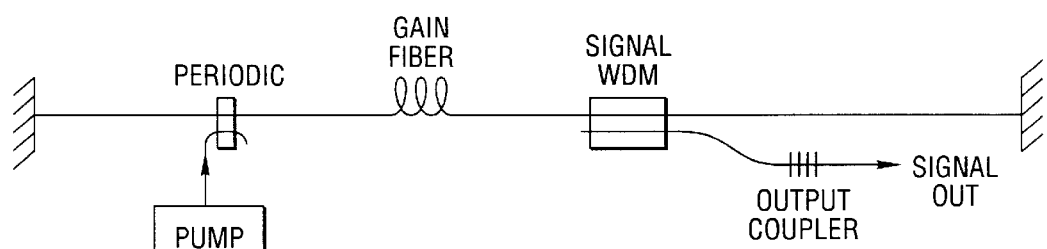

Consider, for example, the periodic filter spectrum in FIG. 2a, which is repeated in FIG. 9a. A higher periodicity WDM can have twice or thrice the periodicity, as included in FIG. 9a. Such couplers could give rise to different configurations, as illustrated in FIGS. 9b, 9c, or 9d. Again, use of the higher periodicity to advantage can reduce the number of required components.

Preferred Embodiments of Raman Amplifiers Using the Transmission Filters

Figure 10A:
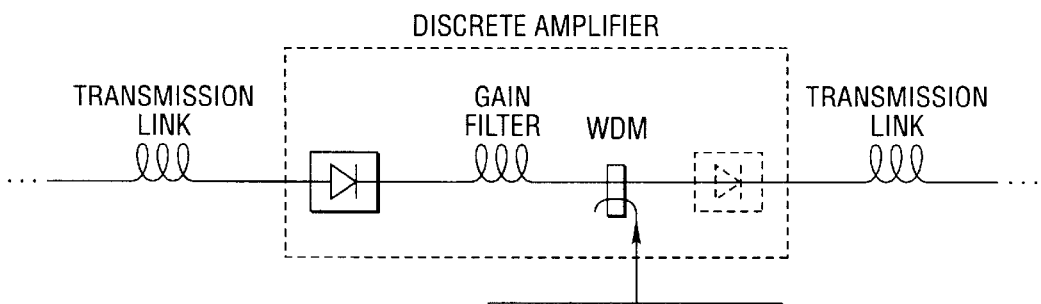
FIGS. 10a and 10b depict Raman amplifiers made by counter-propagating the pump light from Raman oscillators such as shown in FIGS. 3, 5 and 8.

The Raman oscillators using in-line transmission filters described in FIGS. 3–8 can serve as the pump for a discrete or distributed Raman amplifier. The simplest discrete amplifier(FIG. 10a) inserts a gain fiber and at least one isolator in the transmission link (for example, a second post-amplifier isolator is also indicated in FIG. 10a). If further isolation is required to prevent any lasing due to downstream reflections, a second isolator can also be used at the end of the gain fiber. One advantage of this configuration is that the gain fiber can be optimized for amplification of the signal channel. For optimal operation the gain fiber is about 1 km or longer, and for enhanced Raman gain the fiber should have a high germanium content, large core-cladding index difference, and small effective area. The pump from the Raman oscillator is introduced in the counter-propagating direction for two reasons: (a) to avoid coupling of pump fluctuations into the signal beam; and (b) to permit dense WDM multi-channel amplification. Otherwise, closely spaced wavelength channels in the signal beam, which do not have rapid enough walk-off from each-other, could see inter-channel cross-talk from pump depletion.

Figure 10B:
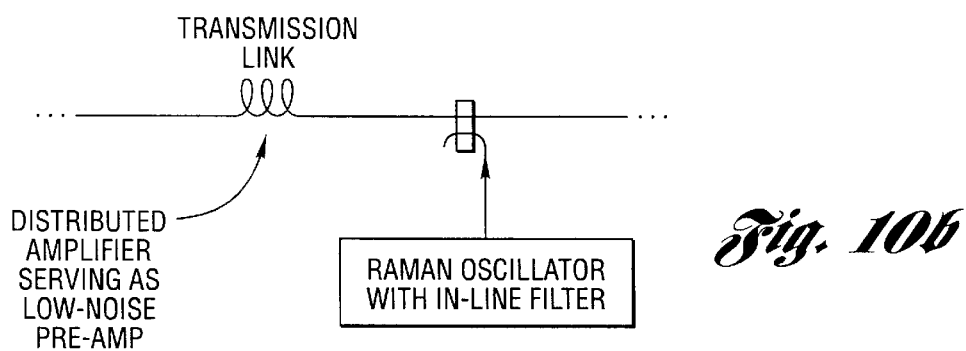

A distributed amplifier can be implemented by integrating the discrete amplifier into the transmission link (FIG. 10b). The transmission link fiber is now the gain medium, and again it is desirable to have counter-propagating pump light from the Raman oscillators with in-line transmission filtering. It has been shown that distributed amplifiers have a number of advantages including that the noise figure is better compared with discrete amplification (c.f. M. X. Ma, H. D. Kidorf, K. Rottv Aft, F. W. Kerfoot and C. R. Davidson, IEEE Photonics Technology Letters, vol. 10, No. 6, pp. 893–895, June 1998). In addition, the configuration of FIG. 10b is beneficial in that it can serve as a low-noise pre-amplifier, and it permits a graceful upgrade of existing transmission systems.

Another preferred embodiment of the discrete amplifier is to combine the ring cavity designs with amplifier section. FIG. 11 illustrates the ring cavity amplifiers, which primarily differ from the ring cavity oscillators of FIG. 8 in that included is a means for inserting the signal as well as removing the signal. All three of these designs are strictly counter-propagating between the signal wavelength and the pump and cascade Raman orders. Note that one of the advantages of the FIG. 11 designs versus the FIG. 10 designs is that the same gain fiber can be used for the Raman cascading and wavelength shifting as for providing gain to the signal. As mentioned in the previous section, the drawback in FIG. 11 is the need for broadband circulators or isolators, which might be constructed out of a series of elements operating at each Raman order.

Figure 11A:
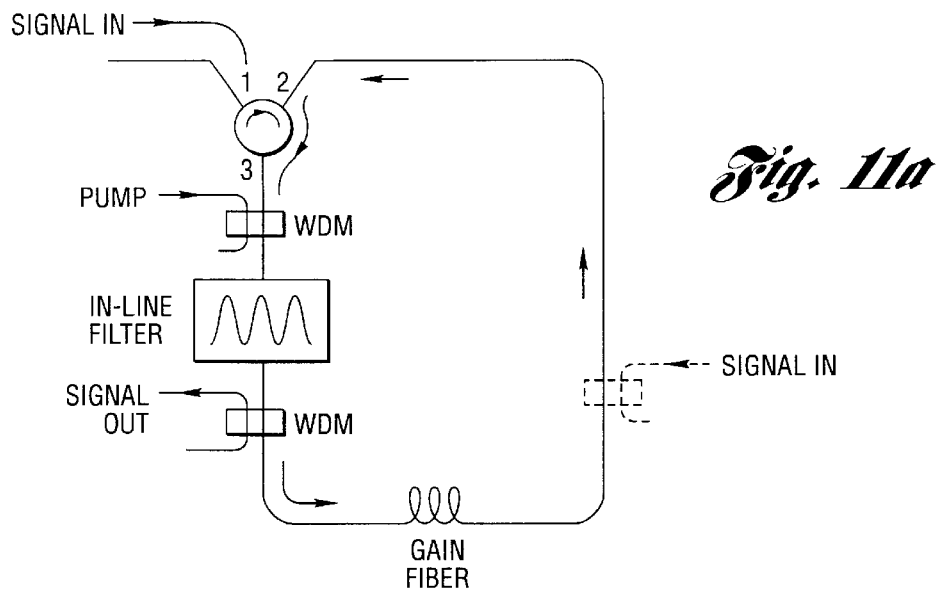
FIGS. 11a–11c depict discrete amplifier designs using ring cavity Raman oscillators; all of these configurations permit strictly counter-propagating amplification of the signal; the amplifiers differ from the oscillators of FIG. 8 in that means are included for inserting the signal beam.
Figure 11B:
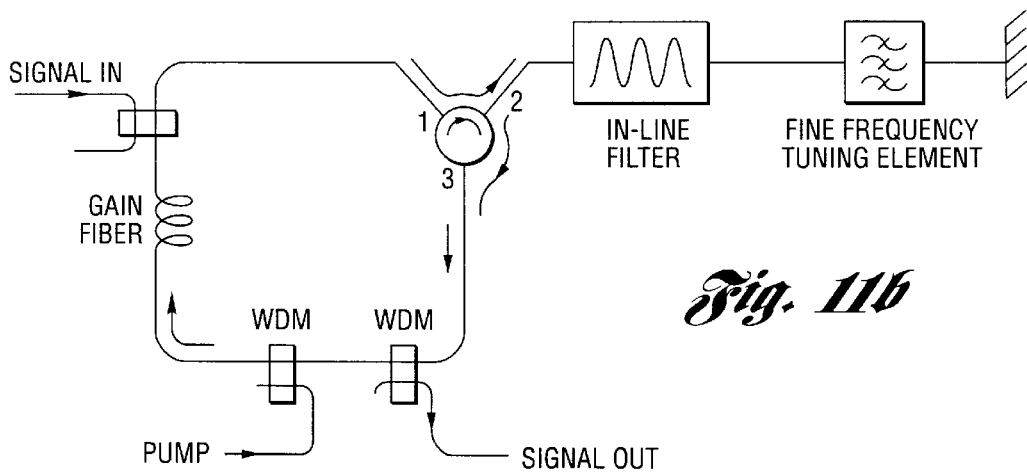

The circulator loop amplifier designs using the in-line transmission filter are shown in FIGS. 11a and 11b. FIG. 11a is a design using only the in-line transmission filter for wavelength control, and the signal may either be brought in through port 1 of the circulator or by introducing a separate WDM on one side of the gain fiber. The pump and Raman cascade orders propagate in the counter-clockwise direction around the loop, while the signal traverses the cavity in the clockwise direction.

The configuration of FIG. 11b permits the introduction of additional fine-frequency tuning elements, particularly reflective filters such as chirped Bragg gratings. In FIG. 11b WDM's are used surrounding the gain fiber both to input and output the signal. The pump and Raman cascade orders propagate in the clockwise direction around the loop and retro-reflect through the transmission filters, while the signal avoids the filters and propagates in the counter-clockwise direction.

Figure 11C:
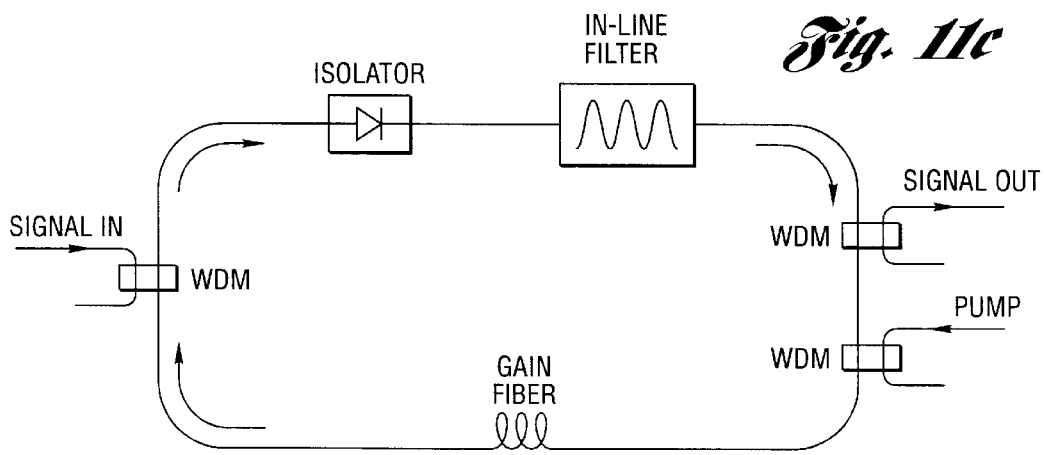

A simple ring cavity design using the in-line transmission filter is also included in FIG. 11c. The broadband isolator is used to turn the ring into a unidirectional cavity, thus forcing the pump and the Raman cascade orders to propagate only in the clockwise direction. Then, WDM's are used to input and output the signal, which travels only in the counter-clockwise direction. Depending on the application and the effect on the signal, the signal may or may not propagate through the pump WDM and the in-line transmission filter.

As with the Raman oscillators, improvements such as illustrated in FIGS. 4 and 5 can also be applied to the ring cavity designs of FIG. 11. These improvements can further reduce the number of intracavity elements, thereby increasing the finesse and efficiency of the ring cavity designs. Also, it should be clear that other means may be used to make the ring cavity design of FIG. 11c unidirectional. All that is required is that the cascade Raman orders grow only in one direction of propagation. For example, this might be accomplished by inserting any element that provides less loss in one direction versus the other. Alternately, feedback might be provided into the cavity to prefer one direction of oscillation over the other.

Figure 12A:
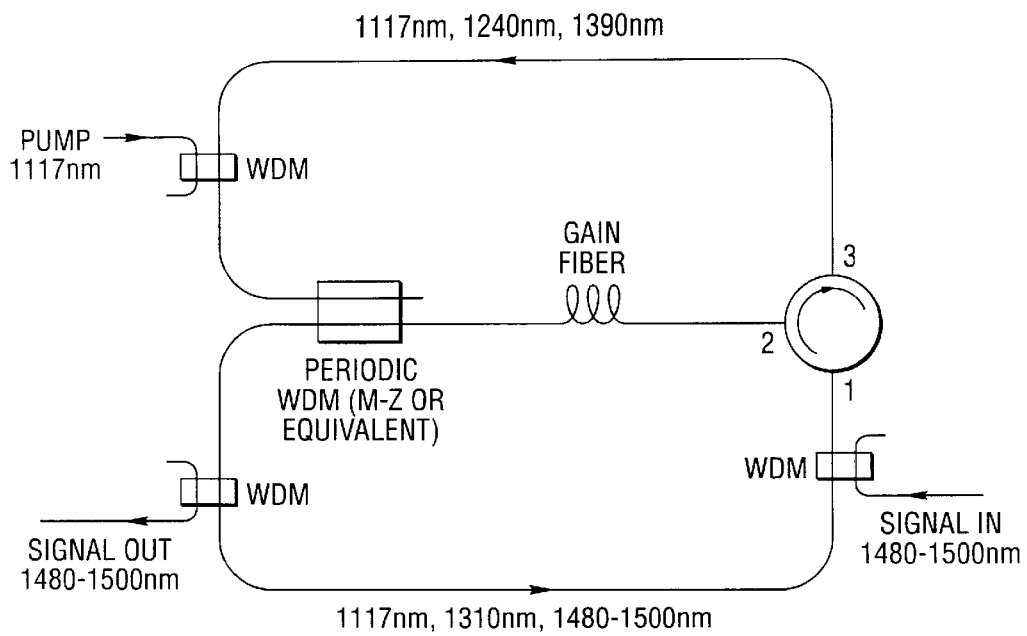
FIGS. 12a and 12b depict more complicated hybrid designs with a circulator loop and a periodic filter, where alternate Raman cascade orders are counter-propagating.
Figure 12B:
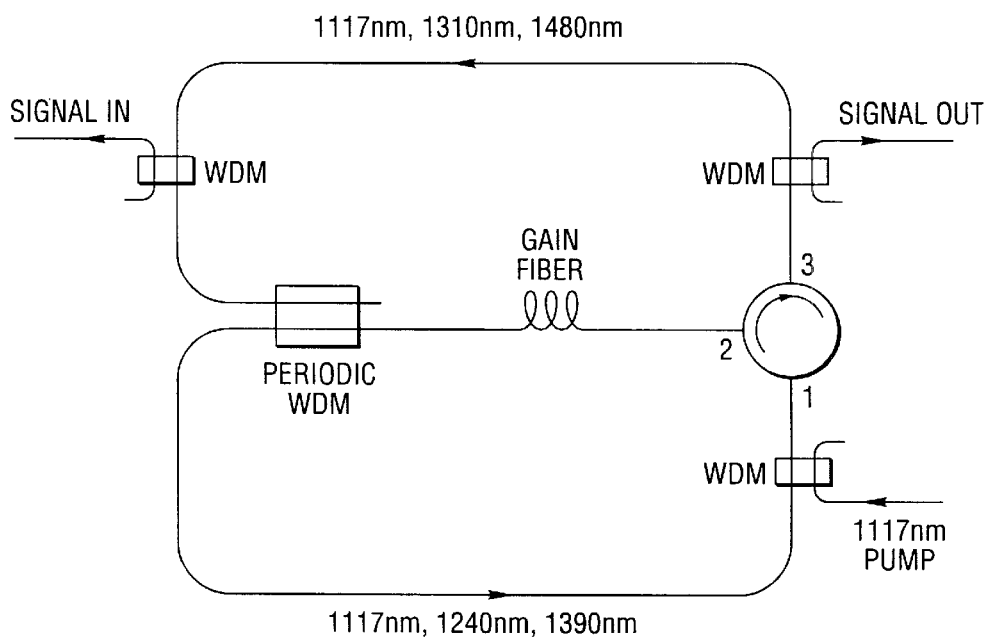

Yet more complicated designs that are a hybrid of the amplifier designs in FIG. 11 are also possible for particular applications. As a specific example, consider an amplifier that is pumped at 1117 nm and that provides amplification in the wavelength range of 1480–1500 nm. For ultra-low noise performance, alternate cascade Raman orders will be made to be counterpropagating. One design that can accomplish this is shown in FIG. 12, where the periodic filter is combined with the circulator loop into two ring cavities. The cascade Raman orders at 1117 nm (the pump wavelength), 1240 nm and 1400 nm circulate in the counter-clockwise direction in the upper loop, while the other interleaved orders 1175 nm, 1310 nm, and the signal band 1480–1500 nm circulate in the counter-clockwise direction in the lower loop. Thus, in the common Raman gain fiber each cascade order is counter-propagating to the adjacent cascade order. Although shown specifically for a particular set of wavelengths, a similar design can be used whenever there are an odd number of cascade Raman orders between the pump and the signal bands.

It is understood that various other modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. A Raman oscillator having high efficiency due to low intracavity loss, the oscillator comprising:

at least one laser cavity;

a distributed gain fiber positioned in the at least one laser cavity, the distributed gain fiber having a single spatial mode over a pumping wavelength to a signal wavelength;

a coupler adapted to be coupled to a pumping mechanism to pump the distributed gain fiber at the pumping wavelength to obtain an optical signal wherein distributed gain is provided by Raman amplification over at least one cascade order corresponding to the pumping wavelength;

a filter positioned in the at least one laser cavity and having at least one pass band with a transmission peak placed approximately at the at least one cascade order to filter the optical signal to obtain a filtered optical signal having the signal wavelength, wherein the filter comprises a substantially continuous sinusoidal filter function over at least one period of the filter function; and an output port for outputting the filtered optical signal.

2. The oscillator as claimed in claim 1, wherein the filter has an all-glass composition.

3. A The oscillator as claimed in claim 1, wherein the filter includes a Mach-Zehnder filter.

4. The oscillator as claimed in claim 1, wherein the file includes a low-Q etalon.

5. The oscillator as claimed in claim 1, wherein the filter includes a fused fiber coupler.

6. The oscillator as claimed in claim 1, wherein the distributed gain is provided by Raman amplification over a plurality of Raman cascade orders including a final Raman order and wherein the filter has pass bands periodic in frequency with transmission peaks placed at the plurality of cascade orders or multiples of the cascade orders.

7. The oscillator as claimed in claim 6, wherein the transmission peaks placed at the cascade orders are separated by approximately 13.2 THz or some multiple of 13.2 THz or some submultiple of 13.2 THz.

8. The oscillator as claimed in claim 6, wherein the transmission peaks are separated by two cascade orders.

9. The oscillator as claimed in claim 1, wherein the distributed gain is provided by Raman amplification over a plurality of cascade orders and wherein the filter includes a band-splitting filter that separates the at least one cascade order from at least another cascade order.

10. The oscillator as claimed in claim 9, wherein the band-splitting filter separates the pumping wavelength from the signal wavelength.

11. The oscillator as claimed in claim 1, wherein the filter includes a band-splitting filter that separates at least one cascade order from at least another cascade order.

12. The oscillator as claimed in claim 1, further comprising:

at least one of a splitter and circulator for splitting the pump wavelength from the signal wavelength outside the at least one laser cavity.

13. The oscillator as claimed in claim 12, wherein the coupler and the output port are combined outside the at least one laser cavity.

14. The oscillator as claimed in claim 1, wherein the at least one laser cavity is a linear laser cavity with first and second ends, and the second end is at least partially reflective.

15. The oscillator as claimed in claim 1, wherein the filter includes the coupler.

16. The oscillator as claimed in claim 1, further comprising:

a second coupler coupled to the coupler and the output port and having different periodicity wherein the pumping wavelength and the signal wavelength are separated by a number of cascade orders outside the at least one laser cavity.

17. The oscillator as claimed in claim 1, further comprising at least one grating positioned in the at least one laser cavity.

18. The oscillator as claimed in claim 17, further comprising a second coupler coupled to the coupler and the output port and having different periodicity wherein the pumping wavelength and the signal wavelength are separated by a number of cascade orders outside the at least one laser cavity.

19. The oscillator as claimed in claim 1, wherein the at least one laser cavity is a ring laser cavity closed on itself.

20. The oscillator as claimed in claim 19, wherein the filter includes an inline periodic filter.

21. The oscillator as claimed in claim 20, wherein the ring laser cavity has an arm and wherein the oscillator further comprises fine-tuning elements positioned in the arm of the ring laser cavity for fine frequency tuning the filtered optical signal.

22. The oscillator as claimed in claim 19, further comprising an isolator positioned in the ring laser cavity to make the ring laser cavity operate unidirectionally.

23. The oscillator as claimed in claim 1, wherein the filter includes a many-order periodic filter.

24. The oscillator as claimed in claim 1, further comprising at least one tuning element positioned in the at least one laser cavity for fine frequency tuning the filtered optical signal.

25. The oscillator as claimed in claim 24, wherein the at least one tuning element comprises a grating.

26. The oscillator as claimed in claim 24, wherein the at least one tuning element comprises a Fabry-Perot interferometer.

27. The oscillator as claimed in claim 24, wherein the at least one tuning element comprises a dielectric structure.

28. The oscillator of claim 1, wherein the at least one pass band comprises a bandwidth of at least ten (10) nanometers.

29. The oscillator of claim 1, wherein the filter comprises at least three (3) ports, and wherein at least two (2) of the at least three (3) ports are positioned within the at least one laser cavity.

30. The oscillator of claim 1, wherein the at least one laser cavity comprises no more than one filter with a transmission peak centered on the at least one cascade order.

31. The oscillator of claim 1, wherein the Raman amplification comprises distributed Raman amplification.

32. The oscillator of claim 1, wherein the Raman amplification comprises discrete Raman amplification.

33. In a fiber optic transmission system including at least one transmission link, an optical amplifier comprising:

an amplifier input port for receiving an input optical signal;

an amplifier distributed gain medium connected to the amplifier input port to amplify the input optical signal;

a Raman oscillator operable to pump the amplifier distributed gain medium at a pumping level sufficiently high so that the input optical signal experiences a gain, the Raman oscillator comprising:

at least one laser cavity;

an oscillator distributed gain fiber positioned in the at least one laser cavity, the oscillator distributed gain fiber having a single spatial mode over a pumping wavelength to a signal wavelength;

a coupler adapted to be coupled to a pumping mechanism to pump the oscillator distributed gain fiber at the pumping wavelength to obtain an oscillator optical signal wherein distributed gain is provided by Raman amplification over at least one cascade order corresponding to the pumping wavelength;

a filter positioned in the at least one laser cavity and having at least one pass band with a transmission peak placed approximately at the at least one cascade order to filter the oscillator optical signal to obtain a filtered oscillator optical signal having the signal wavelength, wherein the filter comprises a substantially continuous sinusoidal filter function over at least one period of the filter function;

an output port for outputting the filtered oscillator optical signal; and an amplifier output port for outputting an amplified input optical signal.

34. The amplifier as claimed in claim 33, wherein the amplifier distributed gain medium is a gain fiber.

35. The amplifier as claimed in claim 34, wherein the gain fiber is pumped in a counter-propagating fashion by the Raman oscillator.

36. The amplifier as claimed in claim 34, wherein the optical amplifier is a distributed amplifier and wherein the at least one transmission link includes the gain fiber of the amplifier so that the distributed amplifier serves as a low-noise amplifier.

37. The amplifier as claimed in claim 33, wherein the optical amplifier is a discrete Raman amplifier.

38. The amplifier as claimed in claim 37, further comprising at least one isolator and wherein the discrete Raman amplifier is positioned within the at least one transmission link.

39. In a fiber optic transmission system, a discrete optical amplifier comprising:

an amplifier input port for receiving an input optical signal;

an amplifier distributed gain medium coupled to the amplifier input port and operable to amplify the input optical signal;

a Raman oscillator to pump the amplifier distributed gain medium, the Raman oscillator comprising:

at least one laser cavity;

a distributed gain fiber positioned in the at least one laser cavity, the distributed gain fiber having a single spatial mode over a pumping wavelength to a signal wavelength;

a coupler adapted to be coupled to a pumping mechanism to pump the distributed gain fiber at the pumping wavelength to obtain an optical signal wherein distributed gain is provided by Raman amplification over at least one cascade order corresponding to the pumping wavelength;

a filter positioned in the at least one laser cavity and having at least one pass band with a transmission peak placed approximately at the at least one cascade order to filter the optical signal to obtain a filtered optical signal having the signal wavelength, wherein the at least one pass band comprises a bandwidth of at least ten (10) nanometers; and an amplifier output port for outputting an amplified input optical signal.

40. The transmission system of claim 39, wherein the filter comprises a sinusoidal filter function.

41. The transmission system of claim 39, wherein the filter comprises at least three (3) ports, and wherein at least two (2) of the at least three (3) ports are positioned within the at least one laser cavity.

42. The transmission system of claim 39, wherein the at least one laser cavity comprises no more than one filter with a transmission peak centered on the at least one cascade order.

43. The transmission system of claim 39, wherein the bandwidth of the at least one pass band is measured at a half-power power point of the pass band.

44. In a fiber optic transmission system, an optical amplifier comprising:

an amplifier input port for receiving an optical signal; and a Raman oscillator, comprising:

at least one laser cavity;

an oscillator distributed gain fiber positioned in the at least one laser cavity, the oscillator distributed gain fiber having a single spatial mode over a pumping wavelength to a signal wavelength;

a coupler adapted to be coupled to a pumping mechanism to pump the oscillator distributed gain fiber at the pumping wavelength to obtain an oscillator optical signal wherein distributed gain is provided by Raman amplification over a plurality of Raman cascade orders including a final Raman order;

a filter positioned in the at least one laser cavity and having pass bands periodic in frequency with transmission peaks placed approximately at the plurality of cascade orders or multiples of the cascade orders to filter the oscillator optical signal to obtain a filtered oscillator optical signal having the signal wavelength, wherein the filter comprises a substantially continuous sinusoidal filter function over at least one period of the filter function;

an output port for outputting the filtered oscillator optical signal.

45. The system of claim 44, wherein the Raman oscillator has a pair of interconnected ring cavities and wherein the distributed gain medium is positioned in each of the ring cavities and wherein the Raman oscillator pumps the distributed gain medium so that the optical signal experiences a gain and to provide for cascaded Raman wavelength shifting and wherein each cascade order is counter-propagated relative to an adjacent cascade order, and wherein the output port of the Raman oscillator outputs the filtered and amplified output signal.

46. A Raman oscillator having high efficiency due to low intracavity loss, the oscillator comprising:

at least one ring laser cavity closed on itself, a distributed gain medium positioned in the at least one ring laser cavity;

a coupler adapted to be coupled to a pumping mechanism to pump the distributed gain medium at a pumping wavelength to obtain an optical signal wherein distributed gain is provided by Raman amplification over at least one cascade order corresponding to the pumping wavelength;

a filter positioned in the at least one ring laser cavity and having at least one pass band with a transmission peak placed approximately at the at least one cascade order to filter the optical signal to obtain a filtered optical signal having a signal wavelength, wherein the filter comprises a substantially continuous sinusoidal filter function over at least one period of the filter function; and an output port for outputting the filtered optical signal.

47. The oscillator as claimed in claim 46, wherein the distributed gain medium is a distributed gain fiber.

48. A Raman oscillator having high efficiency due to low interactivity loss, the oscillator comprising:

at least one linear laser cavity;

a distributed gain medium positioned in the at least one linear laser cavity;

a coupler adapted to be coupled to a pumping mechanism to pump the distributed gain medium at a pumping wavelength to obtain an optical signal wherein distributed gain is provided by Raman amplification over at least one cascade order corresponding to the pumping wavelength;

a filter positioned in the at least one linear laser cavity and having at least one pass band with a transmission peak placed approximately at the at least one cascade order to filter the optical signal to obtain a filtered optical signal having a signal wavelength, wherein the filter comprises at least three (3) ports, and wherein at least two (2) of the at least three (3) ports are positioned in the at least one laser cavity; and an output port for outputting the filtered optical signal.

49. The oscillator of claim 48, wherein at least a portion of the at least one linear laser cavity is a distributed gain fiber with at least one radius of curvature.

50. The oscillator of claim 48, wherein the second end is part of the filter.

51. An optical amplifier configured to be included in a fiber optic transmission system that includes at least one transmission link, comprising:
   an amplifier input port for receiving an input optical signal;
   an amplifier distributed gain medium coupled to the amplifier input port and operable to amplify the input optical signal;
   a Raman oscillator to pump the amplifier distributed gain medium, the Raman oscillator comprising:
      at least one laser cavity;
      an oscillator distributed gain medium positioned in the at least one laser cavity;
      a coupler adapted to be coupled to a pumping mechanism to pump the oscillator distributed gain medium at a pumping wavelength to obtain an optical signal wherein distributed gain is provided by Raman amplification over at least one cascade order corresponding to the pumping wavelength;
      a filter assembly positioned in the at least one laser cavity and having at least one pass band with a transmission peak placed approximately at the at least one cascade order to filter the optical signal to obtain a filtered optical signal having a signal wavelength; and
      an amplifier output port for outputting the amplified input optical signal;
      wherein the at least one laser cavity comprises no more than one filter assembly with a transmission peak approximately centered on any given cascade order.

52. The optical amplifier as claimed in claim 51, wherein the oscillator distributed gain medium is a distributed gain fiber.

53. The optical amplifier as claimed in claim 51, wherein the filter comprises a filter selected from the group consisting of an all-glass composition filter, a Mach-Zehnder filter, and a low-Q etalon filter.

54. The optical amplifier as claimed in claim 51, wherein the filter includes a fused fiber coupler.

55. The optical amplifier as claimed in claim 51, wherein the Raman oscillator distributed gain is provided by Raman amplification over a plurality of Raman cascade orders including a final Raman order and wherein the filter has pass bands periodic in frequency with transmission peaks placed at the plurality of cascade orders or multiples of the cascade orders.

56. The optical amplifier as claimed in claim 55, wherein the transmission peaks placed at the cascade orders are separated by approximately 13.2 THz or some multiple of 13.2 THz or some submultiple of 13.2 THz.

57. The optical amplifier as claimed in claim 55, wherein the transmission peaks are separated by two cascade orders.

58. The optical amplifier as claimed in claim 51, wherein the Raman oscillator distributed gain is provided by Raman amplification over a plurality of cascade orders and wherein the filter includes a band-splitting filter that separates the at least one cascade order from at least one other cascade order.

59. The optical amplifier as claimed in claim 58, wherein the band-splitting filter separates the pumping wavelength from the signal wavelength.

60. The optical amplifier as claimed in claim 51, wherein the filter includes a band-splitting filter that separates the at least one cascade order from at least one other cascade order.

61. The optical amplifier as claimed in claim 51, further comprising:
   at least one of a splitter and circulator for splitting the pump wavelength from the signal wavelength outside the at least one laser cavity.

62. The optical amplifier as claimed in claim 61, wherein the coupler and the output port are combined outside the at least one laser cavity.

63. The optical amplifier as claimed in claim 51, wherein the at least one laser cavity is a linear laser cavity with first and second ends, and the second end is at least partially reflective.

64. The optical amplifier as claimed in claim 51, wherein the filter includes a coupler.

65. The optical amplifier as claimed in claim 51, further comprising:
   a second coupler coupled to the coupler and the output port and having different periodicity wherein the pumping wavelength and the signal wavelength are separated by a number of cascade orders outside the at least one laser cavity.

66. The optical amplifier as claimed in claim 51, further comprising at least one grating positioned in the at least one laser cavity.

67. The optical amplifier as claimed in claim 66, further comprising a second coupler coupled to the coupler and the output port and having different periodicity wherein the pumping wavelength and the signal wavelength are separated by a number of cascade orders outside the at least one laser cavity.

68. The optical amplifier as claimed in claim 51, wherein the at least one laser cavity is a ring laser cavity closed on itself.

69. The optical amplifier as claimed in claim 68, wherein the filter includes an inline periodic filter.

70. The optical amplifier as claimed in claim 69, wherein the ring laser cavity has an arm and wherein the optical amplifier further comprises fine-tuning elements positioned in the arm of the ring laser cavity for fine frequency tuning the filtered optical signal.

71. The optical amplifier as claimed in claim 68, further comprising an isolator positioned in the ring laser cavity to make the ring laser cavity operate unidirectionally.

72. The optical amplifier as claimed in claim 51, wherein the filter includes a many-order periodic filter.

73. The optical amplifier as claimed in claim 51, further comprising at least one tuning element positioned in the at least one laser cavity for fine frequency tuning the filtered optical signal.

74. The optical amplifier as claimed in claim 73, wherein the at least one tuning element comprises an element selected from the group consisting of a grating, a Fabry-Perot interferometer, and a dielectric structure.

75. The optical amplifier as claimed in claim 51, wherein the oscillator distributed gain medium has a single spatial mode over the pumping wavelength to the signal wavelength.

76. The optical amplifier as claimed in claim 51, wherein the amplifier distributed gain medium is a gain fiber.

77. The optical amplifier as claimed in claim 76, wherein the gain fiber is pumped in a counter-propagating fashion by the Raman oscillator.

78. The optical amplifier as claimed in claim 76, wherein the optical amplifier is a distributed amplifier and wherein the at least one transmission link includes the gain fiber of the amplifier so that the distributed amplifier serves as a low-noise amplifier.

79. The optical amplifier as claimed in claim 51, wherein the optical amplifier is a discrete Raman amplifier.

80. The optical amplifier as claimed in claim 79, further comprising at least one isolator and wherein the discrete Raman amplifier is positioned within the at least one transmission link.

81. The optical amplifier of claim 51, wherein the filter comprises a sinusoidal filter function.

82. The optical amplifier of claim 51, wherein the at least one pass band comprises a bandwidth of at least ten (10) nanometers.

83. The optical amplifier of claim 51, wherein the filter comprises at least three (3) ports, and wherein at least two (2) of the at least three (3) ports are positioned within the at least one laser cavity.

84. The optical amplifier of claim 51, wherein the filter assembly comprises a plurality of coupled filters.

85. A Raman oscillator having high efficiency due to low intracavity loss, the oscillator comprising:
  at least one laser cavity;
  a distributed gain medium positioned in the at least one laser cavity;
  a coupler adapted to be coupled to a pumping mechanism to pump the distributed gain medium at a pumping wavelength to obtain an optical signal wherein distributed gain is provided by Raman amplification over at least one cascade order corresponding to the pumping wavelength;
  a multiple-order periodic filter positioned in the at least one cavity and having at least one pass band with a transmission peak placed approximately at the at least one cascade order to filter the optical signal to obtain a filtered optical signal having a signal wavelength, wherein the at least one pass band comprises a bandwidth of at least ten (10) nanometers; and
  an output port for outputting the filtered optical signal.

86. The oscillator as claimed in claim 85, wherein the distributed gain medium is a distributed gain fiber.

87. The oscillator as claimed in claim 85, wherein the filter comprises a filter selected from the group consisting of an all-glass composition filter, a Mach-Zehnder filer, and a low-Q etalon filter.

88. The oscillator as claimed in claim 85, wherein the filter includes a fused fiber coupler.

89. The oscillator as claimed in claim 85, wherein the distributed gain is provided by Raman amplification over a plurality of Raman cascade orders including a final Raman order and wherein the filter has pass bands periodic in frequency with transmission peaks placed at the plurality of cascade orders or multiples of the cascade orders.

90. The oscillator as claimed in claim 89, wherein the transmission peaks placed at the cascade orders are separated by approximately 13.2 THz or some multiple of 13.2 THz or some submultiple of 13.2 THz.

91. The oscillator as claimed in claim 89, wherein the transmission peaks are separated by two cascade orders.

92. The oscillator as claimed in claim 85, wherein the distributed gain is provided by Raman amplification over a plurality of cascade orders and wherein the filter includes a band-splitting filter that separates the at least one cascade order from at least one other cascade order.

93. The oscillator as claimed in claim 92, wherein the band-splitting filter separates the pumping wavelength from the signal wavelength.

94. The oscillator as claimed in claim 85, wherein the filter includes a band-splitting filter that separates the at least one cascade order from at least one other cascade order.

95. The oscillator as claimed in claim 85, further comprising:
  at least one of a splitter and circulator for splitting the pump wavelength from the signal wavelength outside the at least one laser cavity.

96. The oscillator as claimed in claim 95, wherein the coupler and the output port are combined outside the at least one laser cavity.

97. The oscillator as claimed in claim 85, wherein the at least one laser cavity is a linear laser cavity with first and second ends, and the second end is at least partially reflective.

98. The oscillator as claimed in claim 85, wherein the filter includes the coupler.

99. The oscillator as claimed in claim 85, further comprising:
  a second coupler coupled to the coupler and the output port and having different periodicity wherein the pumping wavelength and the signal wavelength are separated by a number of cascade orders outside the at least one laser cavity.

100. The oscillator as claimed in claim 85, further comprising at least one grating positioned in the at least one laser cavity.

101. The oscillator as claimed in claims 100, further comprising a second coupler coupled to the coupler and the output port and having different periodicity wherein the pumping wavelength and the signal wavelength are separated by a number of cascade orders outside the at least one laser cavity.

102. The oscillator as claimed in claim 85, wherein the at least one laser cavity is a ring laser cavity closed upon itself.

103. The oscillator as claimed in claim 102, wherein the filter includes an inline periodic filter.

104. The oscillator as claimed in claim 103, wherein the ring laser cavity has an arm and wherein the oscillator further comprises fine-tuning elements positioned in the arm of the ring laser cavity for fine frequency tuning the filtered optical signal.

105. The oscillator as claimed in claim 102, further comprising an isolator positioned in the ring laser cavity to make the ring laser cavity operate unidirectionally.

106. The oscillator as claimed in claim 85, further comprising at least one tuning element positioned in the at least one laser cavity for fine frequency tuning the filtered optical signal.

107. The oscillator as claimed in claim 94, wherein the at least one tuning element comprises an element selected from the group consisting of a grating, a Fabry-Perot interferometer, and a dielectric structure.

108. The oscillator as claimed in claim 85, wherein the distributed gain medium has a single spatial mode over the pumping wavelength to the signal wavelength.

109. The oscillator of claim 85, wherein the bandwidth of the at least one pass band is measured at a half-power power point of the pass band.

110. In a fiber optic transmission system including at least one transmission link, an optical amplifier comprising:

an amplifier input port for receiving an input optical signal;

an amplifier distributed gain medium connected to the amplifier input port to amplify the input optical signal;

a Raman oscillator operable to pump the amplifier distributed gain medium at a pumping level sufficiently high so that the input optical signal experiences a gain the Raman oscillator comprising:

at least one laser cavity;

an oscillator distributed gain medium positioned in the at least one laser cavity;

a coupler adapted to be coupled to a pumping mechanism to pump the oscillator distributed gain medium at a pumping wavelength to obtain an oscillator optical signal wherein distributed gain is provided by Raman amplification over at least one cascade order corresponding to the pumping wavelength;

a multiple-order periodic filter positioned in the at least one cavity and having at least one pass band with a transmission peak placed approximately at the at least one cascade order to filter the oscillator optical signal to obtain a filtered oscillator optical signal having a signal wavelength, wherein the at least one pass band comprises a bandwidth of at least ten (10) nanometers;

an output port for outputting the filtered oscillator optical signal; and an amplifier output port for outputting an amplified input optical signal.

111. The amplifier as claimed in claim 110, wherein the amplifier distributed gain medium is a gain fiber.

112. The amplifier as claimed in claim 111, wherein the gain fiber is pumped in a counter-propagating fashion by the Raman oscillator.

113. The amplifier as claimed in claim 110, wherein the optical amplifier is a discrete Raman amplifier.

114. The amplifier as claimed in claim 113, further comprising at least one isolator and wherein the discrete Raman amplifier is positioned within the at least one transmission link.

115. The amplifier as claimed in claim 110, wherein the optical amplifier is a distributed amplifier and wherein the at least one transmission link includes the amplifier distributed gain medium so that the distributed amplifier serves as a low-noise amplifier.

116. In a fiber optic transmission system, a discrete optical amplifier comprising:

an amplifier input port for receiving an input optical signal;

an amplifier distributed gain medium coupled to the amplifier input port and operable to amplify the input optical signal;

a Raman oscillator to pump the amplifier distributed gain medium, the Raman oscillator comprising:

at least one laser cavity;

a distributed gain medium positioned in the at least one laser cavity;

a coupler adapted to be coupled to a pumping mechanism to pump the distributed gain medium at a pumping wavelength to obtain an optical signal wherein distributed gain is provided by Raman amplification over at least one cascade order corresponding to the pumping wavelength;

a multiple-order periodic filter comprising at least three (3) ports with at least two (2) of the at least three (3) ports positioned in the at least one cavity and having at least one pass band with a transmission peak placed approximately at the at least one cascade order to filter the optical signal to obtain a filtered optical signal having a signal wavelength; and an amplifier output port for outputting an amplified input optical signal.

117. A Raman oscillator having high efficiency due to low intracavity loss, the oscillator comprising:

at least one laser cavity;

a distributed gain medium positioned in the at least one laser cavity;

a coupler adapted to be coupled to a pumping mechanism to pump the distributed gain medium at a pumping wavelength to obtain an optical signal wherein distributed gain is provided by Raman amplification over at least one cascade order corresponding to the pumping wavelength;

an optical filter comprising at least three (3) ports with at least 2 of the at least three (3) ports positioned in the at least one laser cavity and having at least one pass band with a transmission peak placed approximately at the at least one cascade order to filter the optical signal to obtain a filtered optical signal having a signal wavelength; and an output port for outputting the filtered optical signal.

118. The oscillator as claimed in claim 117, wherein the distributed gain medium is a distributed gain fiber.

119. A Raman oscillator having high efficiency due to low intracavity loss, the oscillator comprising:

at least one laser cavity;

a distributed gain fiber positioned in the at least one laser cavity, the distributed gain fiber having a single spatial mode over a pumping wavelength to a signal wavelength;

a coupler adapted to be coupled to a pumping mechanism to pump the distributed gain fiber at the pumping wavelength to obtain an optical signal wherein distributed gain is provided by Raman amplification over at least one cascade order corresponding to the pumping wavelength;

a filter positioned in the at least one laser cavity and having at least one pass band with a transmission peak placed approximately at the at least one cascade order to filter the optical signal to obtain a filtered optical signal having the signal wavelength, wherein the at least one pass band comprises a bandwidth of at least ten (10) nanometers; and an output port for outputting the filtered optical signal.

* * * * *